United States Patent
Reimnitz

(10) Patent No.: US 10,926,622 B2
(45) Date of Patent: Feb. 23, 2021

(54) DRIVE MODULE AND DRIVE ASSEMBLY FOR A MOTOR VEHICLE

(71) Applicant: Schaeffler Technologies AG & Co. KG, Herzogenaurach (DE)

(72) Inventor: Dirk Reimnitz, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/462,614

(22) PCT Filed: Dec. 12, 2017

(86) PCT No.: PCT/DE2017/101065
§ 371 (c)(1),
(2) Date: May 21, 2019

(87) PCT Pub. No.: WO2018/113840
PCT Pub. Date: Jun. 28, 2018

(65) Prior Publication Data
US 2020/0055386 A1  Feb. 20, 2020

(30) Foreign Application Priority Data
Dec. 23, 2016 (DE) .................. 102016125627.7

(51) Int. Cl.
| | |
|---|---|
| *H02K 11/21* | (2016.01) |
| *H02K 5/173* | (2006.01) |
| *H02K 7/08* | (2006.01) |
| *B60K 6/387* | (2007.10) |
| *B60K 6/26* | (2007.10) |
| *H02K 7/00* | (2006.01) |
| *H02K 7/108* | (2006.01) |
| *F16D 25/10* | (2006.01) |

(52) U.S. Cl.
CPC ............ *B60K 6/387* (2013.01); *B60K 6/26* (2013.01); *H02K 5/1737* (2013.01); *H02K 7/006* (2013.01); *H02K 7/088* (2013.01); *H02K 7/108* (2013.01); *H02K 11/21* (2016.01); *B60Y 2200/92* (2013.01); *F16D 25/10* (2013.01)

(58) Field of Classification Search
CPC ............. H02K 7/10; H02K 5/04; H02K 11/33
USPC .................. 310/68 B, 75 R, 92, 98, 100
See application file for complete search history.

(56) References Cited

U.S. PATENT DOCUMENTS

| | | | |
|---|---|---|---|
| 6,474,428 B1* | 11/2002 | Fujikawa ............... | B60K 6/365 180/65.25 |
| 2013/0297126 A1* | 11/2013 | Yamazaki ............. | B60W 10/06 701/22 |

FOREIGN PATENT DOCUMENTS

| | | |
|---|---|---|
| DE | 4311697 A1 | 10/1994 |
| DE | 102010003442 A1 | 10/2011 |

(Continued)

*Primary Examiner* — Jose A Gonzalez Quinones
(74) *Attorney, Agent, or Firm* — Kevin L. Parks

(57) ABSTRACT

A drive module for a motor vehicle includes a housing, an electric machine, a rotor carrier, and an angular position sensor. The electric machine is for generating a drive torque and includes a rotor. The rotor carrier is connected substantially rotationally fixed to the rotor and mounted such that it can be rotated at least radially. The angular position sensor is for measuring an angular position of the rotor carrier. The angular position sensor is arranged such that the angular position of the rotor carrier or a first component substantially rotationally fixed to the rotor carrier can be detected by the angular position sensor in relation to a second component fixed to the housing.

20 Claims, 16 Drawing Sheets

(56) References Cited

FOREIGN PATENT DOCUMENTS

| | | |
|---|---|---|
| DE | 102011117781 A1 | 5/2013 |
| DE | 102016221948 A1 | 6/2017 |
| DE | 102016207104 A1 | 11/2017 |
| EP | 1710113 A1 | 10/2006 |

\* cited by examiner

DRIVE MODULE AND DRIVE ASSEMBLY FOR A MOTOR VEHICLE

CROSS-REFERENCE TO RELATED APPLICATIONS

This application is the United States National Phase of PCT Appln. No. PCT/DE2017/101065 filed Dec. 12, 2017, which claims priority to German Application No. DE102016125627.7 filed Dec. 23, 2016, the entire disclosures of which are incorporated by reference herein.

TECHNICAL FIELD

The disclosure relates to a drive module for a motor vehicle such as an automobile, a truck, or another commercial vehicle for coupling to an internal combustion engine, and also a drive arrangement for a motor vehicle with the hybrid module according to the disclosure.

BACKGROUND

A preferred embodiment of the drive module is a hybrid module. A hybrid module usually includes a connection device for the mechanical coupling of an internal combustion engine, a disconnect clutch with which torque can be transmitted from the internal combustion engine to the hybrid module and with which the hybrid module can be separated from the internal combustion engine, an electrical machine for generating a drive torque using a rotor, and also a dual-clutch device with which torque can be transmitted from the electrical machine and/or the disconnect clutch to a drivetrain. The dual-clutch device includes a first partial clutch and a second partial clutch. Each arranged clutch is assigned an actuating system.

The electrical machine allows electrical driving, performance gain for internal combustion engine operation and recuperation. The disconnect clutch and the actuating system thereof perform the coupling or uncoupling of the internal combustion engine.

If a hybrid module with a dual clutch is integrated in a drivetrain in such a manner that the hybrid module is located between the internal combustion engine and the gearbox in the torque transmission direction, the internal combustion engine, the hybrid module, the dual clutch with its actuating systems, and the gearbox must be arranged behind or alongside one another in the vehicle.

A drive module positioned in this manner is also referred to as a P2 hybrid module. An assembly of this kind very often leads to installation space problems, however. Current developments are therefore moving towards no longer configuring the so-called P2 hybrid module and the dual clutch as two separate assemblies and arranging them side by side, but developing a hybrid module with an integrated dual clutch. This enables the necessary components to be arranged even more compactly and functionally.

In order to achieve a compact hybrid module with integrated dual clutch, one design principle involves the disconnect clutch and the two partial clutches of the dual clutch being arranged right next to one another. A further design principle involves clutches being arranged completely or partially radially within the electrical machine, as disclosed in DE 10 2010 003 442 A1 and in DE10 2015 223 330 A1, for example, which furthermore teaches that actuating systems are arranged between the disconnect clutch and the main clutch.

If a hybrid module has an integrated dual-clutch device, the internal combustion engine, the hybrid module and the dual-clutch device, with its actuating systems, and the gearbox must be arranged behind or alongside one another in the vehicle. This often leads to installation space problems.

A clutch assembly and a hybrid dual-clutch gearbox, which likewise has a radially interlaced design, are known from DE 10 2011 117 781 A1. In this case, the dual-clutch device is arranged sectionally in the space surrounded by the rotor of the electrical machine. A disconnect clutch for connecting the hybrid module to an internal combustion engine is positioned substantially next to the rotor of the electrical machine, so that the dual-clutch device likewise projects sectionally into the space surrounded by the disconnect clutch. This design produces a compact module in respect of the axial length. However, the disadvantage of this is the large radial extent and the resulting need for a correspondingly stable bearing, in particular of rotating elements of the disconnect clutch.

DE 10 2016 207 104 A1 teaches that a hybrid module for coupling an internal combustion engine, the connection device thereof, disconnect clutch and at least one of the two partial clutches of the dual-clutch device are arranged substantially behind one another. In this case, at least one of the partial clutch clutches, first partial clutch and second partial clutch of the dual-clutch device, is arranged at least sectionally within the space surrounded by the rotor of the electrical machine. An actuating system for actuating the disconnect clutch and also a first actuating system for actuating the first partial clutch of the dual-clutch device are arranged on the side of the electrical machine which is facing the connection device. The hybrid module configured in this way has a small volume overall.

In order to be able to control and energize the coils of the electric motor or the electric machine correctly for setting the respectively required torque or the speed required in each case, the control unit of the electric machine must know the instantaneous position or angular position of the rotor of the electric machine. The position is determined by angular position sensors which detect the position of a component connected to the rotor relative to a component connected to the stator of the electrical machine. Especially for hybrid systems, the particular challenge is to arrange these sensors as compact and reliable as possible.

SUMMARY

The present disclosure provides a drive module, in particular a hybrid module and a drive arrangement fitted with the drive module for a motor vehicle which ensure easy and reliable controllability and low production costs.

The terms "radial", "axial" and "circumferential direction" relate within the framework of the present invention to the rotational axis of the drive module.

The drive module according to the disclosure is, in particular, a hybrid module for a motor vehicle for coupling an internal combustion engine and comprises at least the following components:

an electrical machine having a rotor for generating a driving torque, a rotor carrier connected to the rotor substantially rotationally fixed, which is mounted at least radially rotatory, and an angular position sensor for measuring the angular position of the rotor carrier.

The angular position transmitter is arranged in such a way that the angular position of the rotor carrier or of a component substantially rotationally fixedly connected to the rotor carrier with respect to a component fixed to the housing, such as e.g. a support wall, is detectable.

In particular, this component arranged fixed to the housing can be a component supporting the rotor arm radially inwardly for the purpose of its radial mounting, such as, for example, a section of the support wall extending in the axial direction.

The rotationally fixed component connected to the rotor carrier may be an intermediate shaft.

In particular, therefore, the drive module is a hybrid module, comprising:
a disconnect clutch with which torque can be transmitted from the internal combustion engine to the hybrid module and with which the hybrid module can be disconnected from the internal combustion engine,
an electrical machine for generating a drive torque using a rotor,
a dual-clutch device, with which torque can be transmitted from the electrical machine and/or the disconnect clutch to a drivetrain, having a first partial clutch and a second partial clutch, and
a rotor arm substantially rotationally fixed with the rotor, which is mounted at least radially rotationally.

Furthermore, the hybrid module includes an angular position sensor for measuring the angular position of the rotor carrier. The angular position sensor is arranged such that the angular position of the rotor carrier with respect to a radially inwardly supporting fixed housing-mounted component is detectable with the angular position sensor.

The torque transmitting device may be a clutch, a dual-clutch device with partial clutches, or a torque converter, for example.

The position of the rotor carrier and consequently the rotor of the electric machine can be determined with the angular position sensor, which can also be referred to as a rotary encoder, and thus adapt the control of the electric machine flexibly to the requirements.

The angular position sensor can be designed such that it measures the angular position of the rotor carrier with respect to the supporting component or detects certain positional positions.

Because the angular position sensor is arranged directly on the rotor carrier or on a component fixedly coupled thereto or in close proximity thereto, there can be no distortion of the detected angular position. The immediate proximity to the radially inner bearing reduces positional tolerances in the axial and/or radial direction and/or vibrations, which are present in the angular position sensor for operational reasons. This in turn allows the use of cost-effective sensors or angle encoders and the reduction of their construction volumes.

Furthermore, the drive module can have a separating clutch, with which torque can be transmitted from an internal combustion engine to the drive module, and with which the drive module can be separated from the internal combustion engine, as well as an intermediate shaft for transmitting a torque from the internal combustion engine to the rotor carrier. The intermediate shaft is connected to the rotor carrier in a substantially non-rotational manner and the intermediate shaft is mounted radially rotationally.

This means that the rotary carrier is also rotatably supported by the bearing of the intermediate shaft and the rotationally fixed connection of the intermediate shaft with the rotary carrier. In this embodiment, therefore, the angular position sensor can cooperate with the intermediate shaft. The intermediate shaft is thus rotatably connected to the rotor carrier component.

For this purpose, the drive module further includes an intermediate shaft bearing, which is positioned in the radial direction between the intermediate shaft and the component fixed to the housing. The intermediate shaft bearing can include a plurality of individual bearings, or even a bearing assembly.

This means that the rotor carrier is fixedly arranged on the intermediate shaft, which is rotatably mounted for transmitting torque from a combustion unit to the drive module or in the reverse direction. Accordingly, the angular position sensor is arranged such that a transmitter element is fixedly arranged on the intermediate shaft or the housing and a detection element is arranged on the respective other component. The angular position sensor can directly detect the position or circumferential position of the two components separated only by the bearing and transmit them to the control unit.

Furthermore, the drive module may have as a housing-fixed component a support wall, which serves for the radial support of the rotary bearing of the rotor carrier.

This bearing of the rotor carrier can directly support the rotor carrier, or else support the intermediate shaft, which in turn supports the rotor carrier.

In this embodiment, an axially extending portion of the support wall radially supports the rotor carrier directly or indirectly by means of the intermediate shaft via a suitable rotor carrier bearing.

The rotor carrier bearing is thus arranged between the axially extending portion of the support wall and the rotor carrier or the intermediate shaft. The rotor carrier bearing can include several individual bearings, or even a bearing assembly.

Accordingly, the angular position sensor is arranged such that a transmitter element is arranged on or is formed by the supporting wall, the rotor carrier, or the intermediate shaft, and a detection element is arranged on one of the other components.

In the embodiment of the drive module with an intermediate shaft, this is mounted radially inward in the axially extending portion of the support wall by means of an extra intermediate shaft bearing which also serves as a rotor arm bearing.

The housing-fixed support wall can also include several segments and/or have an angled course. The support wall is connected directly or indirectly to the stator of the electric machine and also forms a static fixed element of the drive module.

The angular position sensor itself can have a transmitter element and a detection element, wherein the detection element is arranged on the support wall and the transmitter element is arranged on or on the intermediate shaft or the rotor carrier.

Preferably, the transmitter element is a transmitter wheel, which is arranged on the intermediate shaft or on or on the rotor carrier.

Furthermore, the drive module can be designed such that it has a housing and the angular position sensor has a transmitter element and a detection element. The drive module further includes a clutch device, in particular, a separating clutch or dual clutch device including a first partial clutch and a second partial clutch, with which the torque from the electric machine and/or from the separating clutch to a drive train is transferable. In addition, the drive module includes a clutch actuation system for actuating the clutch devices of the drive module, which is arranged in a housing element. The detection element is integrated in the housing element of the clutch actuation system.

In a specific embodiment of the angular position sensor, the transmitter element is an integral part of the component on which it is arranged. Thus, for example, formed sections or a transmitter wheel may be integrated into the intermediate shaft so that the intermediate shaft is the transmitter itself.

The rotor carrier may be rotationally mounted by means of a rotor bearing arrangement having a plurality of individual bearings; the encoder element and the detection element being arranged between bearings of the rotor carrier mounting.

For the purposes of the disclosure, the rotor carrier bearing means a bearing which directly supports the rotor carrier, for example with respect to a support wall or an axially extending section of the housing or the support wall. In this case, the intermediate shaft bearing also has the function of the rotor carrier bearing, if the only rotational bearing of the rotor carrier takes place via the bearing of the intermediate shaft. In a corresponding manner, embodiments of the drive module according to the disclosure are also based on the intermediate shaft bearing, insofar as this has the function of the rotor arm bearing.

In an alternative embodiment, it is provided that the rotor carrier is rotationally mounted by means of a rotor carrier bearing and that the transmitter element and the detection element are arranged or formed in or on the rotor carrier bearing, so that the rotor carrier bearing and the angular position encoder together form a structural unit. This unit can be pre-assembled, for example. In this case, the angular position transmitter can even be fastened directly to a bearing ring of a bearing of the rotor carrier bearing (for example the bearing inner ring or bearing outer ring) and detect the position of the other bearing ring or the position of a transmitter element fastened to the other bearing ring.

The drive module or hybrid module can have a dry-running separating clutch and a wet-running dual clutch device. Preferably, the angular position sensor is arranged in the drying space of the separating clutch where it can still detect the position of the rotor carrier and the rotor in the wet space of the dual clutch device when arranged on the intermediate shaft. This has the advantage that the angular position sensor lines are not in the wet space and require less effort for sealing or isolation.

A drive arrangement for a motor vehicle with an internal combustion engine and a drive module according to the disclosure and with a transmission is also provided. The drive module is mechanically connected to the internal combustion engine and the transmission via clutches of the drive module.

BRIEF DESCRIPTION OF THE DRAWINGS

The disclosure described above is explained in detail below against the relevant technical background with reference to the associated drawings which show example embodiments. The disclosure is in no way limited by the purely schematic drawings. It should be noted that the exemplary embodiments shown in the drawings are not limited to the dimensions shown. The attached drawings show different embodiments of a hybrid module according to the disclosure in half-section.

In this case

DETAILED DESCRIPTION

Figure 1:
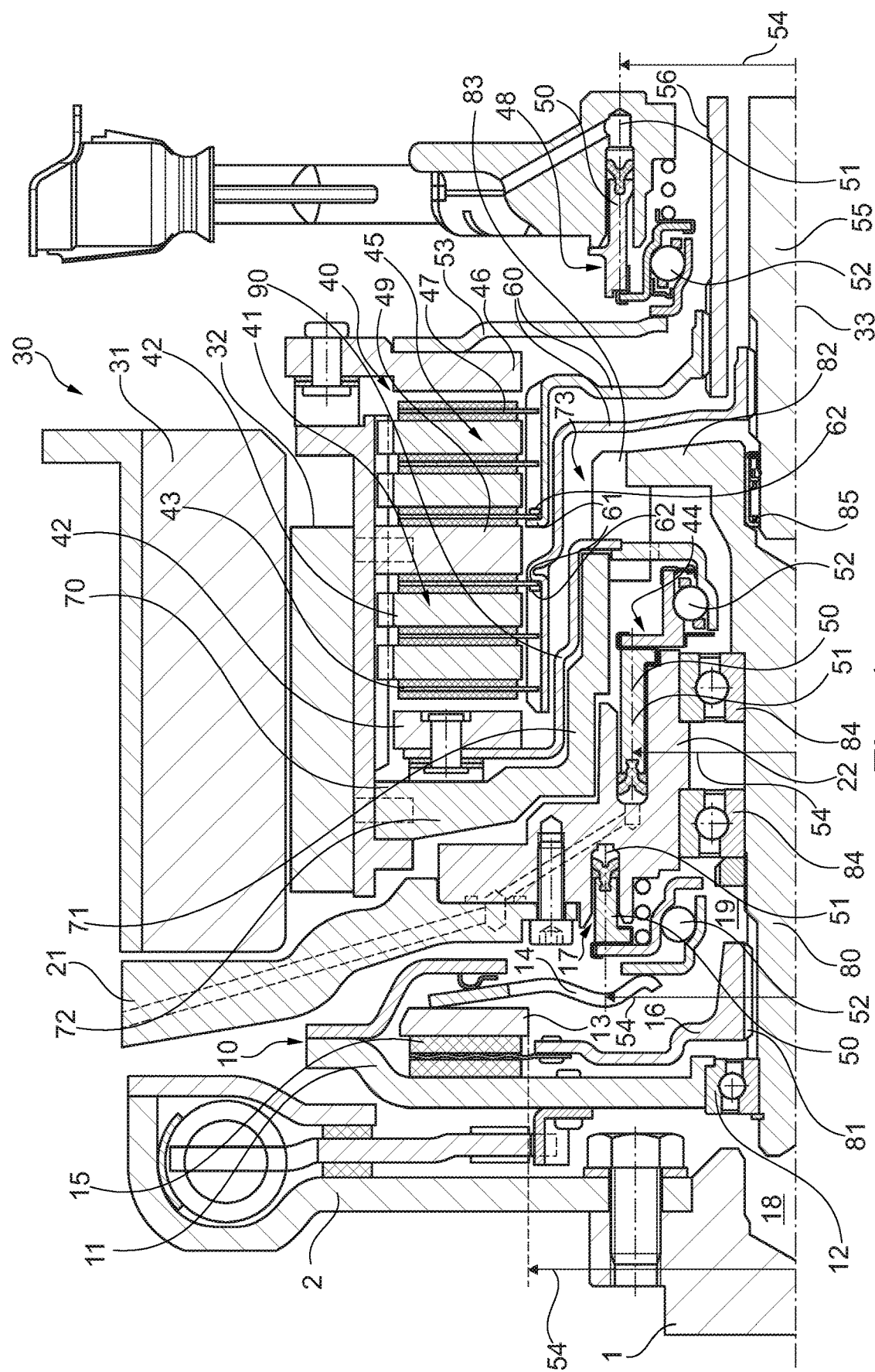
FIG. 1 shows a hybrid module with the disconnect clutch pressed open.

In the following, the general design of a hybrid module according to the disclosure is explained with the help of FIG. 1.

The hybrid module is designed to be attached to a crankshaft 1 of an adjacent combustion assembly (not shown in the attached figures). A dual-mass flywheel 2 which is connected to the crankshaft 1 in a rotationally fixed manner and also to a disconnect clutch 10 of the hybrid module is normally used to this end.

A counter-pressure plate 11 of the disconnect clutch 10 is connected to the dual-mass flywheel 2 in a rotationally fixed manner in this case. The counter-pressure plate 11 is mounted by means of a support bearing 12 either on an intermediate shaft 80 or on the crankshaft 1.

The disconnect clutch 10 is substantially formed by the counter-pressure plate 11 and a contact-pressure plate 13 and at least one clutch disk 15 positioned between the contact-pressure plate 13 and the counter-pressure plate 11. Furthermore, the disconnect clutch 10 includes a disconnect clutch actuating system 17 and also a spring element 14, the axial force of which presses the contact-pressure plate against the clutch disk and thereby clamps the clutch disk between the contact-pressure plate and the counter-pressure plate and in this way ensures a frictional connection for the purpose of torque transmission. The torque applied to the clutch disk 15 is applied to the intermediate shaft 80 by the clutch disk via a transmission element 16 and a spline 81.

In this way, a torque can be transmitted by a drive side 18 from the crankshaft 1 to an output side 19 on the intermediate shaft 80.

Furthermore, the hybrid module includes a support wall 21 which extends into the inside of the hybrid module. The support wall 21 has a portion 22 extending in an axial direction which may be an integral part of the material of the support wall 21 or may also be formed by an additional component. A stator 31 of an electrical machine 30 or of an electric motor may be fixedly connected to a housing of the hybrid module. The rotor 32 of the electrical machine is arranged in a rotational manner within the stator 31. The rotor 32 and also the intermediate shaft 80 rotate about a common rotational axis 33.

The hybrid module has a rotor carrier 70 for the rotational connection of the intermediate shaft 80 to the rotor 32. A dual-clutch device 40 of the hybrid module is coupled to the rotor carrier 70 as a torque transmission device.

The hybrid module is therefore configured in such a manner that a torque supplied by the crankshaft 1 can be transmitted via the closed disconnect clutch 10, from the disconnect clutch to the intermediate shaft 80, from the intermediate shaft to the rotor carrier 70 and from the rotor carrier to the dual-clutch device 40.

The dual-clutch device 40 is in turn coupled rotationally via carrier devices 60 to a first gearbox input shaft 55 and also to a second gearbox input shaft 56, so that torque can be transmitted from the dual-clutch device 40 closed at the sides to the gearbox input shafts 55, 56.

It goes without saying that torque transmission in the reverse direction is also possible.

Consequently, by opening the disconnect clutch 10 the attached combustion unit can be uncoupled from the electrical machine 30 rotationally. This enables the combustion unit to be switched off when the hybrid vehicle is driving in electrical mode. The torque present at the rotor 32 of the electrical machine 30 can be transmitted via the dual-clutch device 40 when the device is closed at the sides to the gearbox input shafts 55, 56 to a gearbox not shown here, irrespective of whether the available torque is produced by the electrical machine 30 or by the coupled combustion unit.

The dual-clutch device 40 includes a first partial clutch 41 with a contact-pressure plate 42 and a clutch disk 43. Furthermore, the dual-clutch device 40 includes a second partial clutch 45 with a contact-pressure plate 46 and a clutch disk 47. Both partial clutches are designed as multi-disk clutches or plate clutches and have further disks or fine plates and further intermediate plates or intermediate fine plates. Each of the two partial clutches 41, 45 is assigned an actuating system, namely the first partial clutch 41 is assigned a first actuating system 44 and the second partial clutch 45 a second actuating system 48. The two partial clutches 41, 45 have a common, centrally arranged counter-pressure plate 49 which supports the clutch disks 43, 47 during actuation of one of the two partial clutches 41, 45 and ensures frictional engagement.

Each actuating system 17, 44, 48 has a piston-cylinder unit 50 in which the respective piston is displaceable along a feed direction in the associated cylinder. In order to transmit this translational movement to a respective clutch, actuating bearings 52 are arranged which allow this translational movement or transmission of force from the rotationally fixed actuating system to the rotatable clutch. In most embodiments of the hybrid module, the actuating bearings act on spring elements 53 frequently configured as pressure pots which then act on the corresponding clutch, such as on a contact-pressure plate, for example.

For the purpose of mounting the intermediate shaft 80, the rotor carrier 70 has a radial portion 72 to which an axial portion 71 is joined.

This axial portion 71 receives an intermediate shaft bearing 84 for the radial bearing and, for example, also for the axial bearing of the intermediate shaft 80. This intermediate shaft bearing 84 may be formed by a plurality of rolling bearings or also by a compact bearing unit. Furthermore, some embodiments of the hybrid module according to the disclosure also comprise an additional bearing 85 for supporting end regions of the intermediate shaft 80.

The intermediate shaft 80 is connected to the rotor carrier 70 via an at least rotationally fixed connection 83. To this end, the intermediate shaft 80 has a radial portion 82 which extends from the end region of the intermediate shaft 80 which lies opposite the attachment to the disconnect clutch 10. The connection 83 to the rotor carrier 70 is made on this radial portion 82.

In order to actuate the first partial clutch 41 of the dual-clutch device 40, the actuating system 44 thereof is coupled by a connection element 90 configured as a tie rod, which is also referred to as a pressure pot, to the contact-pressure plate 42 of the first partial clutch 41. In order to facilitate this function and also to achieve transmission of the torque from the intermediate shaft 80 to the rotor carrier 70, recesses 73 are arranged in the rotor carrier 70 and also in the tie rod 90, which recesses can also be referred to as through-passages. These recesses may be arranged in an alternating manner. They allow the through-passage of the rotor carrier 70 through the tie rod 90 and, conversely, the fastening thereof by the rotor carrier 70, so that a translational movement of the tie rod 90 for the purpose of transmitting the translational movement to the contact-pressure plate 42 and consequently actuation of the first partial clutch 41 can take place. In this way, the first actuating system 44 which is arranged on one side of the rotor carrier 70 can actuate the first partial clutch 41 which is arranged on the other side of the rotor carrier 70.

Figure 15:
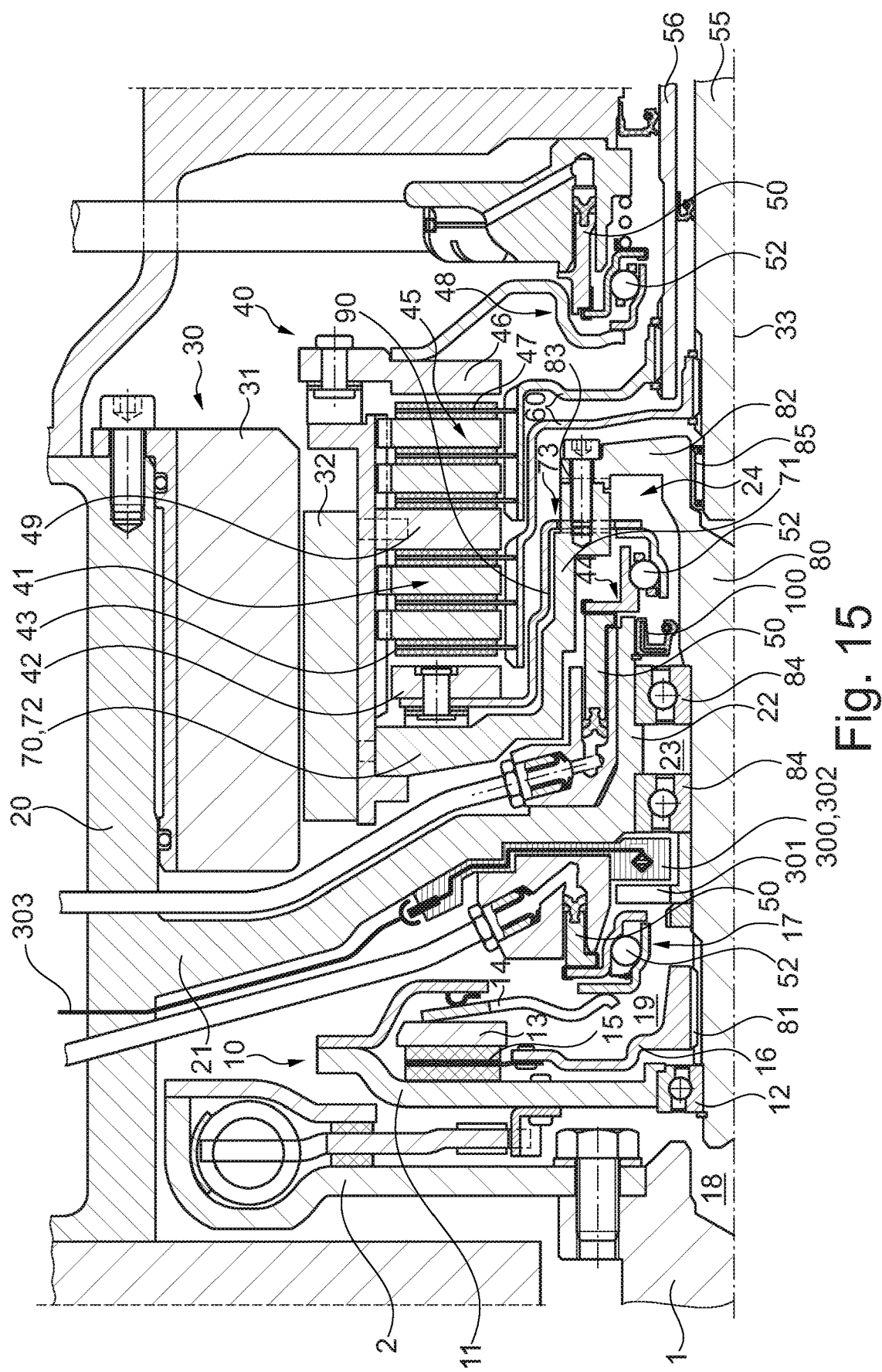
FIG. 15 shows a hybrid module with an angular position sensor in a second embodiment; and, FIG. 16 shows a hybrid module with an angular position sensor in a third embodiment.

The embodiment depicted in FIG. 15 is differently configured by comparison. In this case, there is a plurality of recesses 73 arranged on the circumference of the axial portion of the rotor carrier 72. The supporting regions between the recesses 73 are formed as joining points between the rotor carrier 70 and the intermediate shaft 80. In this way, the tie rod 90 likewise provided with recesses 73 can be extended radially to the first actuating system 44. During assembly, the lugs present between the recesses 73 of the rotor carrier 70 and/or the lugs located between the recesses 73 and the material of the intermediate shaft 80 are introduced through the recesses 73 in the tie rod 90. Thereafter, the rotor carrier 70 and the intermediate shaft 80 are assembled and permanently connected to one another by means of a screw connection, for example.

The embodiments of the disconnect clutch shown in FIGS. 1 to 12 are all configured in such a manner that the radial extent of a respective piston-cylinder unit has a greater radial spacing in relation to a rotational axis of the rotor than a circumferential path of a respective actuating bearing in relation to the rotational axis of the rotor. In this case, however, the radial extent of the piston-cylinder units is smaller than that of the elements of the disconnect clutch 10 providing the frictional engagement and also the dual-clutch device 40. The actuating systems 17, 44, 48 are all arranged axially alongside one another. Slight radial offsets with respect to one another are possible. In other words, none of the three actuating systems 17, 44, 48 in FIGS. 1-12 is arranged radially outside another actuating system. Consequently, no actuating bearing 52 assigned to a respective actuating system must be arranged radially outside another actuating bearing 52, so that all actuating bearings 52 can be executed with relatively small diameters and produce correspondingly small drag losses.

In most embodiments of the hybrid module, the disconnect clutch 10 is arranged proximate to the crankshaft 1 of the combustion unit, so that the intermediate shaft 80 can be rigidly connected to the rotor 32 of the electrical machine 30. This facilitates the use of an intermediate shaft bearing 84 sitting very far inwardly radially which at the same time can also support the rotor 32 or the rotor carrier 70.

The support wall 21 is located between the disconnect clutch 10 and the dual-clutch device 40. The disconnect clutch actuating system 17 and the first actuating system 44 for the first partial clutch 41 and the intermediate shaft bearing 84 are supported by the support wall 21. The intermediate shaft bearing 84 in this case is located on the radially inner side in the portion 22 of the support wall 21 extending in an axial direction. The support wall 21 is only penetrated by the intermediate shaft 80. The actuating systems 17, 44 in this case may be arranged in the respective, or also in a common, component which is connected to a suitable mechanical connection with a radially running element of the support wall 21. In an alternative embodiment, the actuating systems 17, 44 are arranged or received directly in the support wall 21.

The actuating systems may be configured in such a manner that they are operated hydraulically or pneumatically. The fluid required for operation in each case is fed through channels in the support wall to the respective actuating system or through separate lines, such as those depicted in FIG. 15, for example.

The hybrid module according to the disclosure is not limited to the use of a pneumatic or hydraulic operating system in this case, but may also be based on a mechanical, electromechanical or semi-hydraulic mode of operation. The actuating systems depicted in the figures have a CSC (concentric slave cylinder) design.

Due to the opposite arrangement of the disconnect clutch actuating system 17 and also the first actuating system 44 on the support wall 21, the forces applied by these actuating systems act in an opposing manner, so that they can cancel each other out to some extent, as a result of which tensions in the hybrid module are reduced. The second actuating system 48 for the second partial clutch 45 of the dual-clutch device 40 is arranged on the side of the hybrid module facing the gearbox.

The hybrid module according to the disclosure is configured in such a manner that the diameters of the actuating bearing 52 are smaller than the diameters of the piston-cylinder units 50 of the actuating systems 17, 44, 48. Accordingly, the actuating bearings 52 are relatively small and bring about small energy losses caused by the bearing operation.

The rotor 32, the rotor carrier 70 and also the intermediate shaft 80 form an S-shaped cross section in the axial half-section through the hybrid module. In this way, a strong radial interlacing of the individual units in the hybrid module is possible, as a result of which the installation space made available can be optimally used. The rotor 32, the radial portion of the rotor carrier 72 and the axial portion of the rotor carrier 71 enclose a large part of the dual-clutch device 40 in this case. The axial portion of the rotor carrier 71, the radial portion of the intermediate shaft 82 and the substantially axially running basic body of the intermediate shaft 80 enclose the actuating system 44 for the first partial clutch almost completely.

The dual-clutch device 40 in the embodiments shown is configured as a multi-disk clutch or a multi-plate clutch. In both partial clutches 41, 45 of the dual-clutch device, the contact-pressure plates 42, 46 are centered via resetting springs, for example leaf springs. The intermediate plates or intermediate disks are attached in a rotationally fixed manner to the rotor carrier 70 connected to the rotor 32 or else to a component fixedly arranged thereon. The clutch disks 43, 47 of the two partial clutches 41, 45 are each guided and centered on a carrier device 60 also referred to as an inner plate carrier. These carrier devices 60 transmit the clutch moment of the respective partial clutch 41, 45 to the gearbox input shafts 55, 56. There are different formulations for fixing the respective axial position of the carrier devices.

FIG. 1 shows an embodiment in which the carrier device 60 is connected in an axially fixed manner to the rearmost clutch disk 43, 47 in the effective direction of the respective contact-pressure force. To this end, the respective carrier device 60 has a radial projection 61 which extends to the radially outer side. The rearmost clutch disk 43, 47 in each case is fixedly attached to this radial projection 61 by means of a mechanical connection 62. This means that the carrier device 60 can be axially displaced in the spline of a respective gear input shaft 55, 56 as far as the rearmost clutch disk 43, 47 can also be axially displaced. Consequently, the carrier devices 60 are captively connected to the dual-clutch device 40. In order to assemble the hybrid module with a gearbox, the carrier devices are fitted to the splines of the gearbox input shafts 55, 56.

Figure 2:
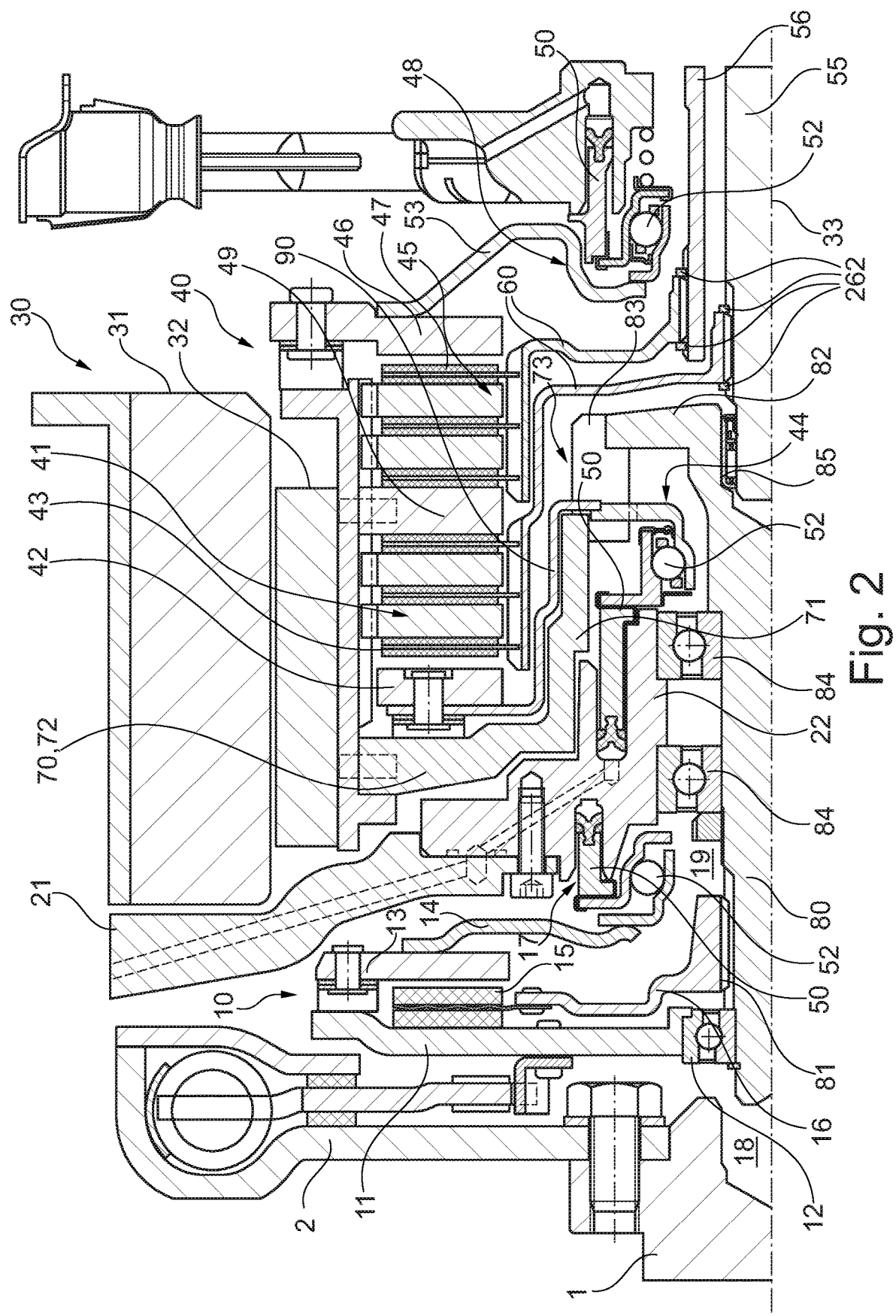
FIG. 2 shows a hybrid module with the disconnect clutch pressed closed.

FIG. 2 shows an alternative embodiment of the hybrid module with axial fixing of the carrier devices 60. In this case, the carrier devices 60 are axially fixed by axially locking securing elements 262, such as shaft locking rings, for example, which are positioned in the spline of a respective gearbox input shaft 55, 56. In order to assemble the hybrid module on a gearbox, the carrier devices 60 are therefore fitted to the gearbox input shafts 55, 56 and fixed there, before the remaining connection of the hybrid module to the gearbox is made. During the pushing-together of the hybrid module and gearbox, the toothing contours of the clutch disks 43, 47 and the carrier device 60 are located.

For the purpose of making assembly easier, the dual-clutch device 40 may be fitted with transport locking elements which close the partial clutches 41, 45 completely or partially, or a pre-centering device may be provided for the clutch disks 43, 47. Insofar as the carrier device 60 is mounted on the gearbox input shafts 55, 56 before they are connected to the dual-clutch device 40, the pressure pot or spring element 53, which acts upon the contact-pressure plate 46 of the second partial clutch 45, must be pre-assembled on the gearbox side. This pressure pot or spring element 53 is fitted onto the second actuating system 48 before the carrier devices 60 are mounted on the gearbox input shafts 55, 56.

The spring element 53 or else the pressure pot also has a cylindrical region with which it can be pre-centered on the second actuating system 48. If these are assembled during the course of the assembly of the hybrid module to the gearbox, the pressure pot or spring element 53 comes into contact with the contact-pressure plate 46 of the second partial clutch 45, which centers it even more accurately and positions it during operation of the dual-clutch device 40. The pre-centering in this case is designed in such a manner that it loses its effect in the completely mounted state and does not therefore create an unwanted friction point.

The fact that the intermediate shaft is fixedly connected to the rotor carrier 70 means that the intermediate shaft bearing 84 also acts as a rotor bearing. Due to the fastening of the clutch disks of the dual-clutch device 40 to the rotor carrier 70, the dual-clutch device 40 is therefore also partially supported via the rotor carrier 70 by the intermediate shaft 80 and consequently via the intermediate shaft bearing 84.

Due to the radial interlacing of the individual structural elements, the dual-clutch device 40 is arranged at least partially in the radially outer region of the intermediate shaft bearing 84, so that radial forces applied by the dual-clutch device 40 do not act as unfavorable tilting moments on the intermediate shaft bearing 84.

In the case of the embodiments of the hybrid module depicted in FIGS. 1, 2 and 10-15, the disconnect clutch 10 is mounted on the intermediate shaft 80 by means of a support bearing 12. This means that actuating forces acting on the disconnect clutch 10 are not transmitted to the crankshaft 1, but are applied to the intermediate shaft 80 and from there introduced via the intermediate shaft bearing 84 into the support wall 21. Particularly in the case of a pressed-closed disconnect clutch 10, as is depicted in FIG. 2, the disconnect clutch actuating system 17 must constantly produce a large axial force. In this case, the support of the disconnect clutch 10 on the supporting bearing 12 on the intermediate shaft 80 offers the advantage that axially applied forces do not have to be supported via the plain bearings of the crankshaft 1. Accordingly, the crankshaft bearings may be smaller in size, which results in lower bearing operation-related losses on the crankshaft 1.

In addition, the support bearing 12 does not perform a relative rotational movement when the disconnect clutch 10 is closed, as is the case during operation of the combustion unit. In a case like this, only the bearing of the disconnect clutch actuating system 17 is turned, so that only small drag losses can occur in this case. To the extent that the combustion unit is switched off, however, there is no relative rotational movement in this case either. Consequently, no losses occur in the actuating bearing of the disconnect clutch actuating system 17 when the vehicle is only driven with the electrical machine.

Only in the event that both motors are working and there is a differential speed between the motors do the supporting bearings 12 and also the actuating bearing of the disconnect clutch actuating system 17 turn simultaneously. These operating phases are relatively short, however. Long-lasting driving states mainly occur due to the operation of only one drive unit, so that only one bearing is also ever rotationally moved.

Figure 3:
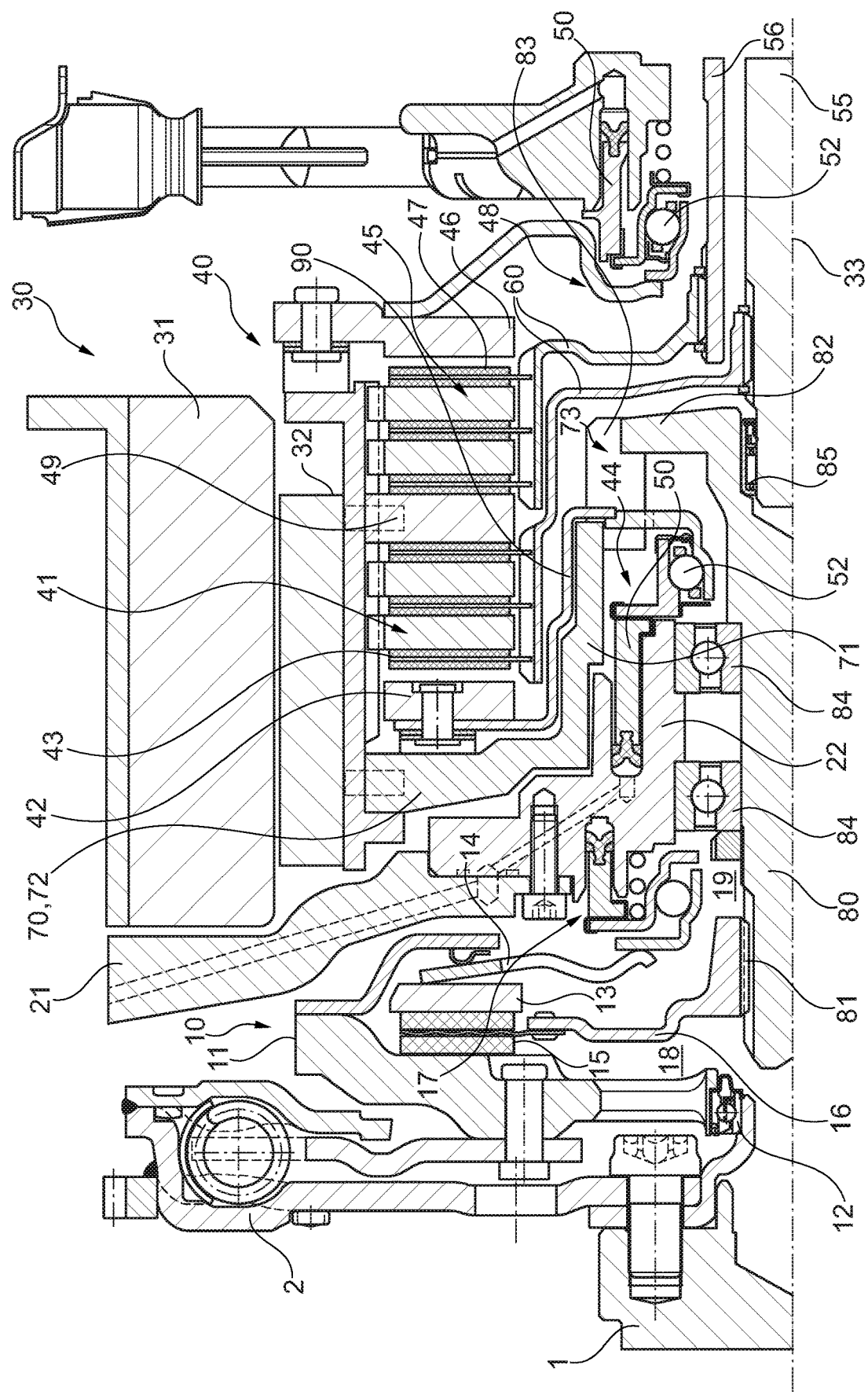
FIG. 3 shows a hybrid module with a pressed-open disconnect clutch supported on the crankshaft.

The embodiments depicted in FIGS. 1 and 3 have a pressed-open disconnect clutch 10. The embodiment shown in FIG. 3 has a disconnect clutch 10 which is supported on the crankshaft 1 by means of a support bearing 12 as a component of the secondary side of the dual-mass flywheel 2. Consequently, this embodiment has no support bearing which supports the disconnect clutch 10 on the intermediate shaft 80. In driving modes in which the internal combustion engine is switched off and the vehicle travels in purely electric mode, there are therefore no bearing operation-related losses on the disconnect clutch 10.

In the situation in which the combustion unit transmits torque via the disconnect clutch 10 to the intermediate shaft 80, the axial force exerted by the disconnect clutch actuating system 17 is supported on the rotating crankshaft 1. However, when the disconnect clutch 10 is pressed open the axial force which the disconnect clutch actuating system 17 applies to the disconnect clutch in the closed state is relatively small, so that the axial load on the crankshaft 1 is permissible. This design is available for hybrid vehicles which are designed for high proportions of driving in electric mode.

Figure 4:
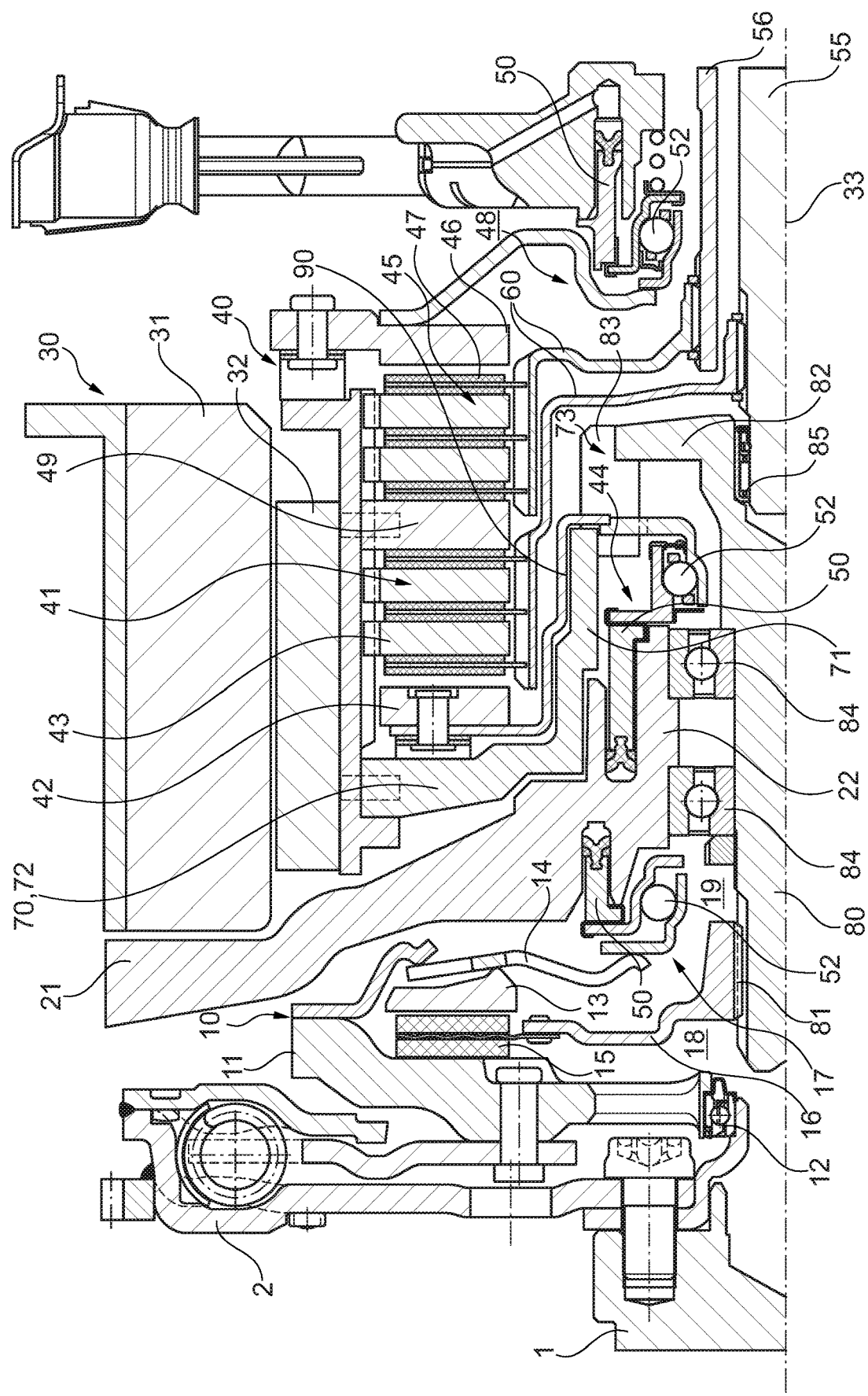
FIG. 4 shows a hybrid module with a pressed-closed disconnect clutch supported on the crankshaft.
Figure 5:
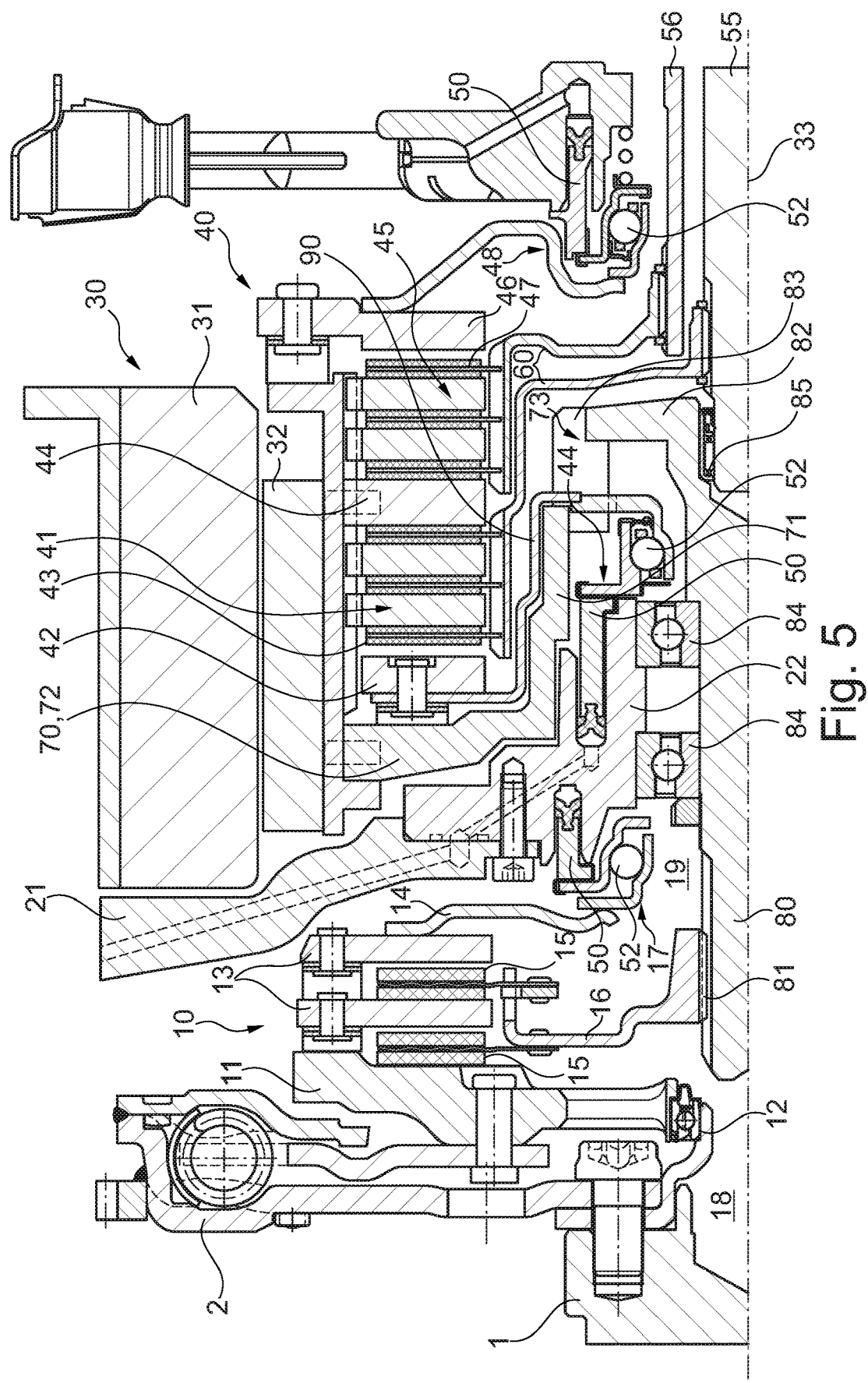
FIG. 5 shows a hybrid module with a pressed-open multi-disk disconnect clutch supported on the crankshaft.
Figure 6:
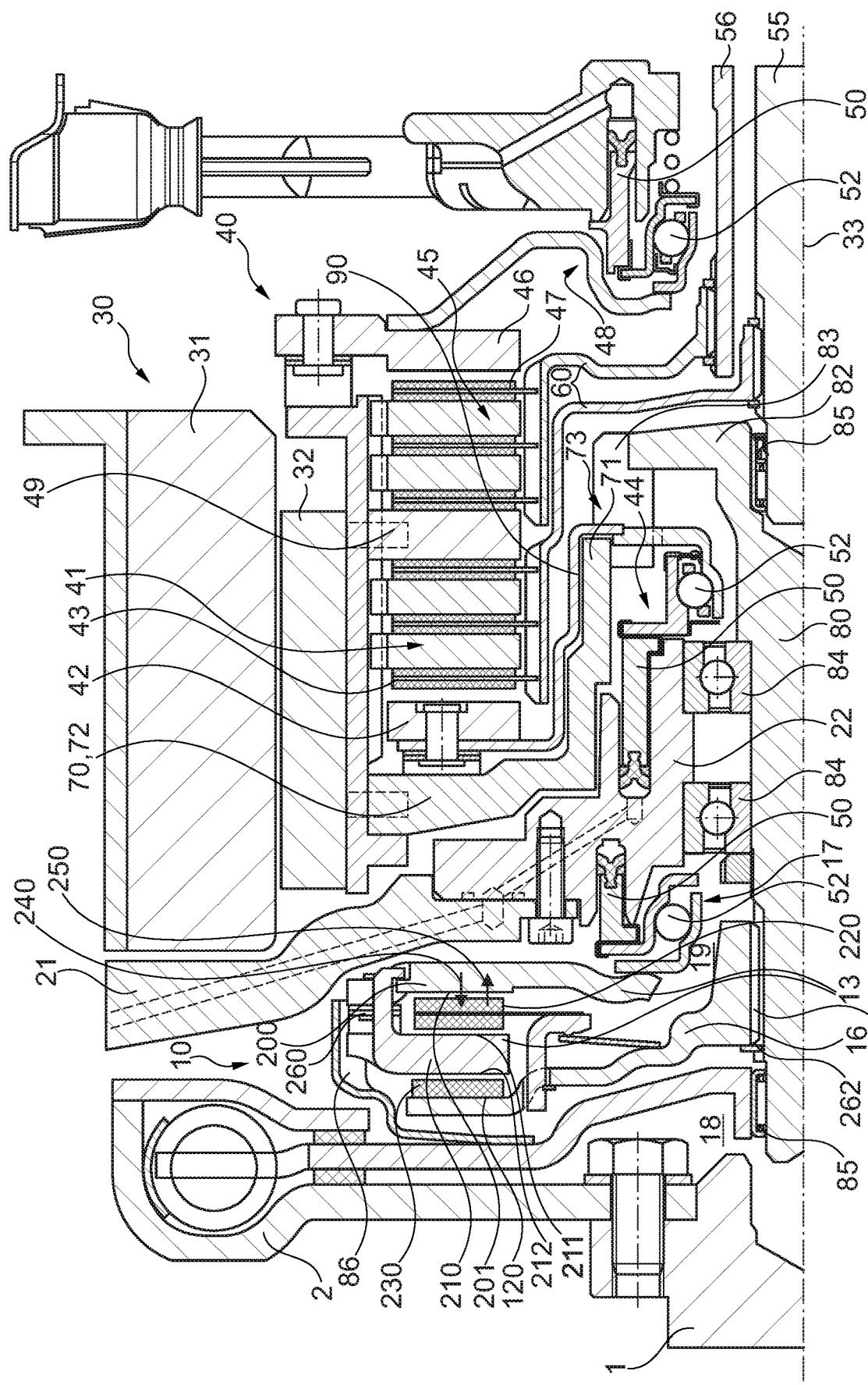
FIG. 6 shows a hybrid module with a pressed-closed disconnect clutch with three frictional surfaces in a first embodiment.

Insofar as the disconnect clutch 10 is configured as a pressed-closed clutch and is mounted on the crankshaft 1, the pressing-in force required for the disconnect clutch 10 can also be kept at a low level via a lever transmission, as depicted in FIG. 4, and/or by a plurality of clutch disks or friction plates, as depicted in FIG. 5.

In a further embodiment of the hybrid module shown in FIGS. 6-9, a pressed-closed disconnect clutch 10 is attached by its drive side 18 to a crankshaft 1 and by its output side 19 to the intermediate shaft 80.

This disconnect clutch 10 has a plurality of contact-pressure elements 201, 211, 212. There is an odd number of contact-pressure elements 201, 211, 212 and these are axially displaceable. Furthermore, the disconnect clutch 10 has a plurality of clutch disks 220, 230. One of the clutch disks 120 is axially fixed and the contact-pressure elements 201, 211, 212 are supported or supportable on the drive side and a supporting force 250 directed against the contact-pressure force or axial force 240 and also the axially fixed clutch disk 120 is supported or can be supported on the output side 19 of the disconnect clutch 10.

This means that the disconnect clutch 10 has a first frictional surface on a first contact-pressure plate 200 as the first contact-pressure element 201 and two further frictional surfaces on a second contact-pressure plate 210 on opposite sides as a second contact-pressure element 211 and a third contact-pressure element 212.

If the disconnect clutch 10 is closed, the disconnect clutch actuating system 17 brings about an axial force 240 which is transmitted to the first contact-pressure plate 200 and from this via a first contact-pressure element 201 to the first clutch disk 220. The first clutch disk 220 in turn transmits the axial force 240 to the second contact-pressure plate 210 which is arranged in an axially displaceable manner. In this case, the axial force 240 is applied to the side facing the first clutch disk 220 which forms the second contact-pressure element 211 of the disconnect clutch 10 as a further frictional surface. Due to the axial displacement of the second contact-pressure plate 210, this transmits the axial force 240 via a third contact-pressure element 212 as a further frictional surface, which contact-pressure element lies opposite the second contact-pressure element 211 on the second contact-pressure plate 210, on the axially fixed clutch disk 120 which forms the second clutch disk 230 of the disconnect clutch 10. In this way, when the disconnect clutch closes, all three frictional surfaces are pressed against one another, so that torque can be transmitted.

The driven side of the disconnect clutch 10 connected to the crankshaft 1 of the combustion unit rotationally via the dual-mass flywheel 2 or torsional vibration damper substantially includes the axially displaceable first contact-pressure plate 200 with a frictional surface and also the likewise axially displaceable intermediate plate or second contact-pressure plate 210 with 2 frictional surfaces. The output side, via which torque is supplied to the intermediate shaft 80 and therefore to the electrical machine 30 and the dual-clutch device 40, essentially includes the first clutch disk 220 with two frictional surfaces and the second clutch disk 230, 120 which is axially fixed or limited in respect if its axial displacement with a frictional surface.

Due to the odd number of frictional surfaces or the contact-pressure elements realized on the contact-pressure plates 200, 210, the axial force 240 and the supporting force 250 acting against the axial force 240 for producing a static equilibrium are supported on the same side of the disconnect clutch 10, namely on the output side 19 in this case.

Consequently, in an embodiment of the hybrid module of this kind with a closed disconnect clutch 10, the axial forces generated by the disconnect clutch actuating device 17 need not be transmitted to the crankshaft 1, but are axially supported on the intermediate shaft 80 or on a component axially connected to the intermediate shaft. In this case, this support of the axial forces takes place without a support bearing. Consequently, there can also be no drag losses produced by a support bearing.

The design with an odd number of contact-pressure elements or frictional surfaces has the advantage that the forces introduced by the actuating system into the subassembly of the clutch connected to the drive can be supported on the subassembly connected to the output. Using the same design, forces can also be transmitted from the output side to the drive side.

So that the disconnect clutch 10 is ventilated during opening on all three frictional surfaces or between the contact-pressure plates and the clutch disks, the axially displaceable components of the disconnect clutch 10 are connected in a spring-mounted manner to the dual-mass flywheel 2 or the crankshaft 1. This spring-mounted attachment ensures that the two contact-pressure plates 200, 210 are pushed in the direction of the disconnect clutch actuating system 17, when the force effect thereof abates.

Furthermore, the disconnect clutch 10 includes an opening device 260 which is at least configured between the contact-pressure plates 200, 210, so that the first clutch disk 220 arranged between the two contact-pressure plates 200, 210 is sufficiently far removed from the contact-pressure plates 200, 210 or is ventilated. When the disconnect clutch 10 is closed, the forces brought about by the opening device 260 are overcome by the disconnect clutch actuating system 17, so that the frictional surfaces are pressed against one another. If the axial force brought about by the disconnect clutch actuating system 17 drops sufficiently, the opening device 260 and the spring-mounted connection to the dual-mass flywheel 2 brings about the opening of the disconnect clutch 10. In this case, the piston of the piston-cylinder unit 50 of the disconnect coupling actuating systems 17 is also pushed back.

In order to keep the drag torque of the disconnect clutch 10 as low as possible in the open state, the disconnect clutch 10 should exhibit end stops to which the opening device 260 can push each of the contact-pressure plates 200, 210 and which define the end positions of these contact-pressure plates 200, 210 in the open state.

Likewise, the piston of the disconnect clutch actuating system 17 should have an end limit of this kind which is simultaneously used as a reference for the displacement of the axially movable components of the disconnect clutch for the purpose of opening the clutch. The end position of the piston or of the disconnect clutch actuating system therefore defines the end position of the contact-pressure plate 200, 211 in the open state and thereby ensures that the friction contact between the second contact-pressure plate 210 and the axially fixed clutch disk 120 is ventilated at the correct distance.

The elements of the disconnect clutch 10 which expose the contact-pressure plates 200, 210 to the axial force 240 and bring about their axial displacement may be component parts, where appropriate, which also transmit the torque from the internal combustion engine via the crankshaft 1, such as leaf springs, plates springs and/or carrier springs, for example.

Likewise, elastic component parts may be inserted between the contact-pressure parts 200, 210, which component parts are used both for the axial displacement of the component parts among one another and also for component centering and torque transmission, such as leaf springs and/or plate springs, for example.

The first clutch disk 220 is likewise connected to the intermediate shaft 80 in an axially displaceable and rotationally fixed manner. Here, too, elastic or spring-mounted components can be used and also end stops, in order to ventilate the first clutch disk 220 reliably.

Figure 7:
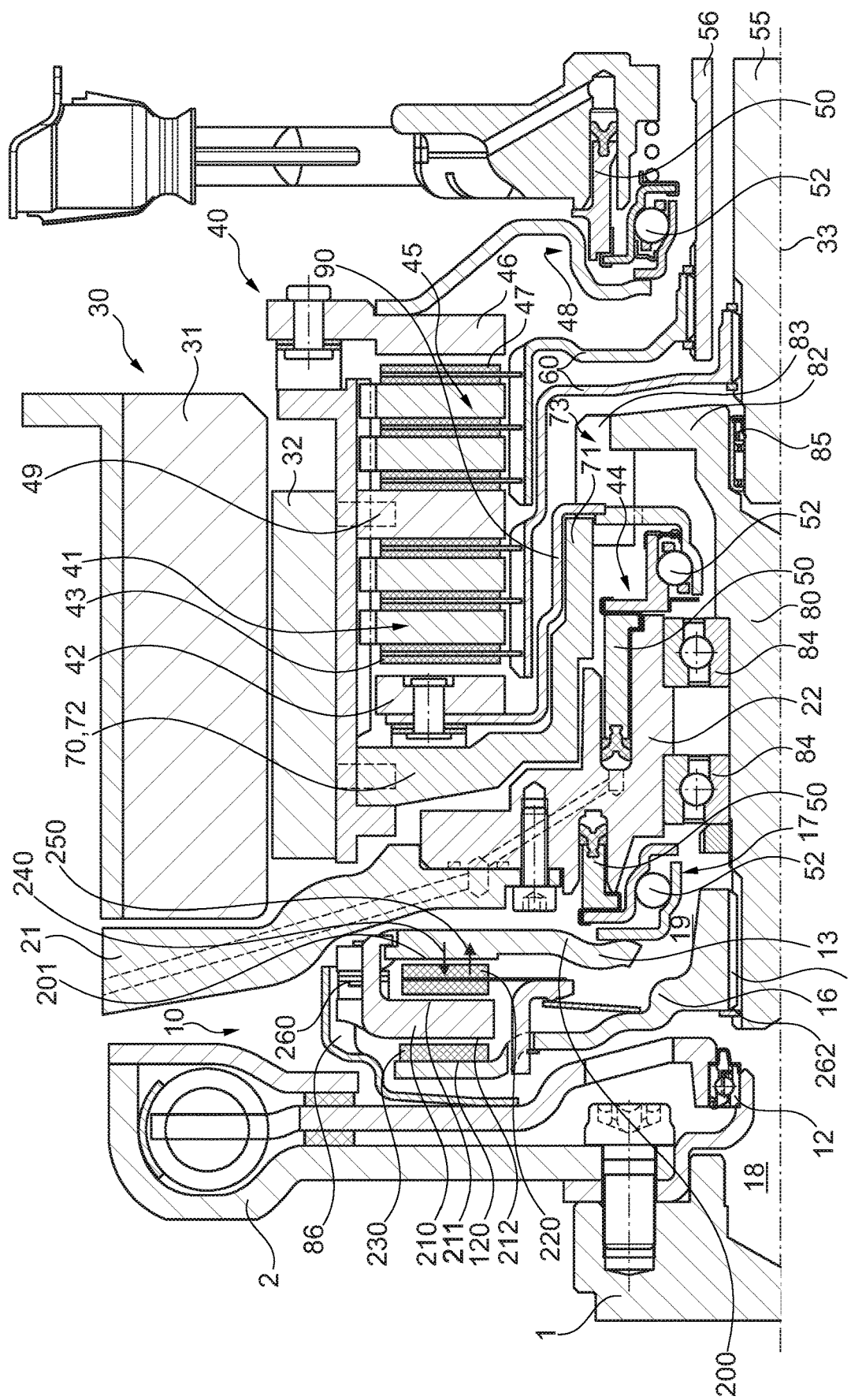
FIG. 7 shows a hybrid module with a pressed-closed disconnect clutch with three frictional surfaces in a second embodiment.

The aforementioned elastic components may also be used for the radial centering of the disconnect clutch 10 in relation to the intermediate shaft 80 and also the dual-mass flywheel 2. The disconnect clutch 10 is then supported radially on the secondary side of the dual-mass flywheel 2. This secondary side of the dual-mass flywheel 2 may then be supported by a radially acting additional bearing 85 on the intermediate shaft 80, and also depicted in FIG. 6, or on the primary side of the dual-mass flywheel 2 which is connected to the crankshaft 1, as depicted in FIGS. 7, 8 and 9.

For assembly of the hybrid module on the combustion unit, it is advisable for a spline 86 or another axially available connection to be provided between the drive side of the disconnect clutch 10 and the dual-mass flywheel 2 or another equalizing element, as depicted in FIGS. 6-9.

Hence, for example, the spring-mounted elements which can displace the contact-pressure plates 200, 210 axially and/or the elements which are used to transmit torque between the dual-mass flywheel 2 and the disconnect clutch 10 may have a plug connection arranged on the dual-mass flywheel 2 or arranged centrally or on sides of the disconnect clutch 10 or be fastened directly or indirectly to the dual-mass flywheel 2 via a plug connection of this kind, as depicted in FIGS. 6-9. This enables the dual-mass flywheel 2 firstly to be mounted on the crankshaft 1 and fixed there, for example through recesses in the secondary side of the dual-mass flywheel 2. The disconnect clutch 10 itself can then be mounted on the intermediate shaft 80 of the hybrid module. For this purpose, a transmission element 16 fixedly connected to the axially fixed clutch disk 120 is pushed onto the intermediate shaft 80 and axially secured, for example by a securing element 262 in the form of a shaft locking ring.

Figure 8:
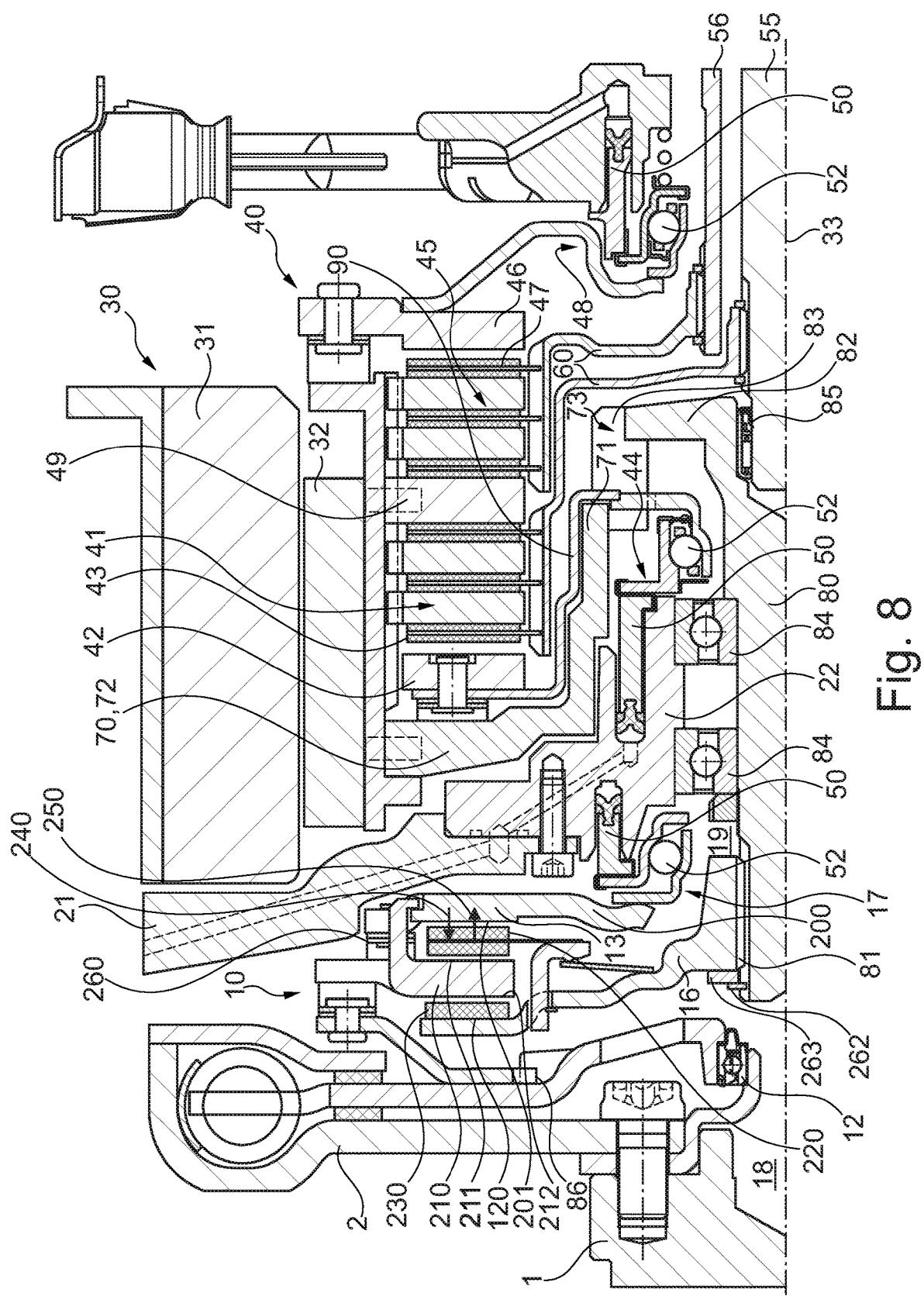
FIG. 8 shows a hybrid module with a pressed-closed disconnect clutch with three frictional surfaces in a third embodiment.
Figure 9:
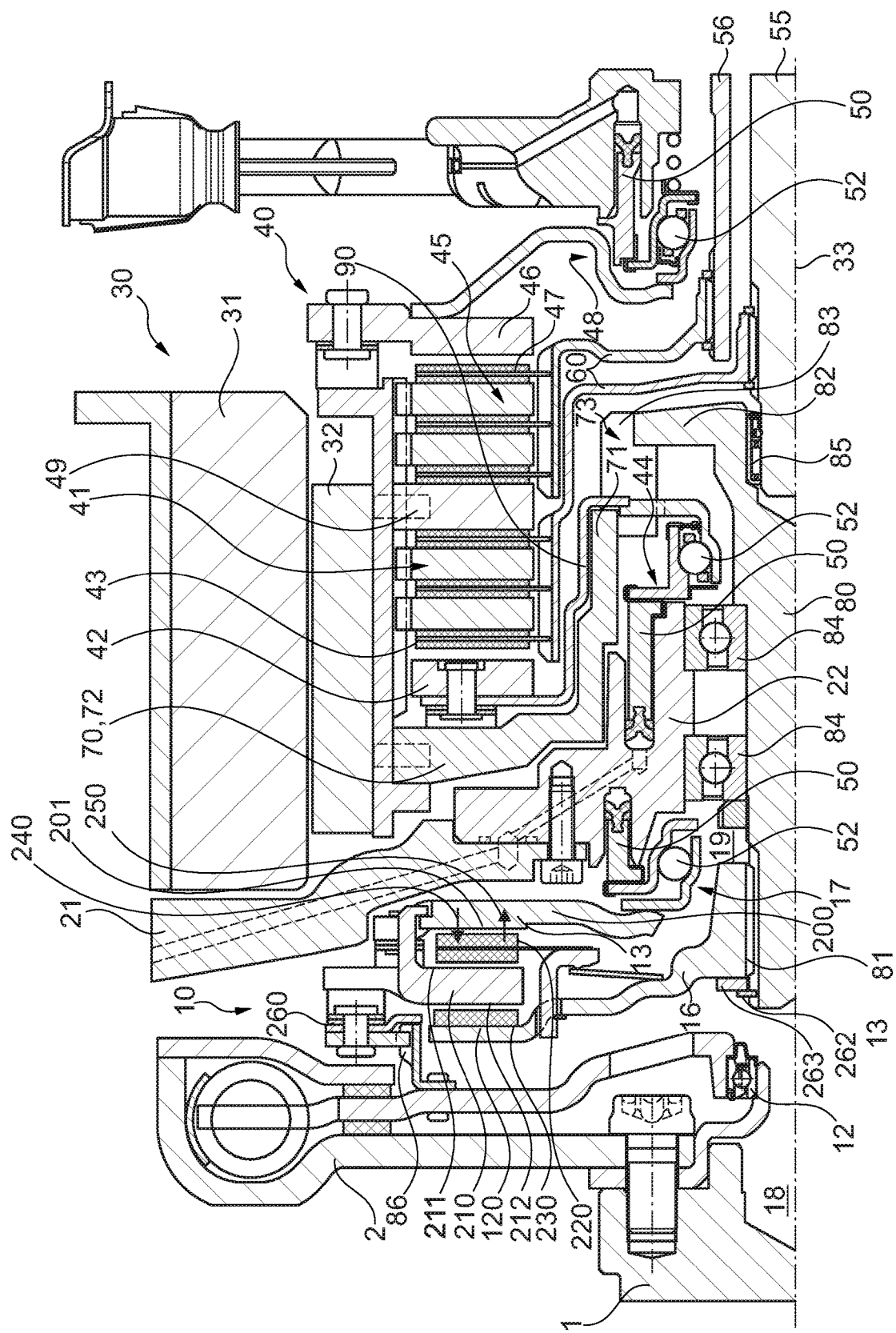
FIG. 9 shows a hybrid module with a pressed-closed disconnect clutch with three frictional surfaces in a fourth embodiment.

So that the disconnect clutch 10 or else the clutch disks 220, 230 thereof are arranged at the correct distance from the disconnect clutch actuating system 17, one or more adjusting disks 263 may be arranged between the transmission element 16 and the axial securing element 262, as shown in FIGS. 8 and 9. In order to pre-center the contact-pressure plates 200, 210 in the state of the disconnect clutch 10 not yet attached to the dual-mass flywheel 2, radial pre-centering limit stops may be provided between the contact-pressure plates 200, 210 and the support wall 21, as depicted in FIGS. 8 and 9, or else the disconnect clutch actuating system 17 or the clutch disks 220, 230.

If the combustion unit to which the dual-mass flywheel 2 is already attached is assembled with the hybrid module which already has the disconnect clutch 10, a connection is made between the disconnect clutch 10 and the dual-mass flywheel 2 by the plug-in connection described above. If the disconnect clutch is connected to the dual-mass flywheel 2, the precise radial centering of the contact-pressure plates 200, 210 takes place via the dual-mass flywheel 2 and the friction points on the pre-centering limit stops disappear. This means that an extra bearing for receiving the forces acting axially between the drive and output subassembly becomes superfluous, which increases the energy efficiency of a clutch device of this kind or a hybrid module configured therewith. In this case, the number of contact-pressure elements or frictional surfaces is not limited to the number of three shown, but it may also be five, seven or more. The number of clutch disks can then of course also be increased accordingly.

In the embodiments shown, the intermediate shaft 80 is a central component which is used to support a plurality of components or subassemblies. The intermediate shaft bearing 84 must support axial forces from a plurality of actuating systems 17, 44, 48, center them all on their fastened components, and hold them in position and absorb their moments of inertia and spinning forces. Insofar as the rotor 31 of the electrical machine 30 is also mounted by means of the intermediate shaft 80, the intermediate shaft bearing 84 must be accomplished very precisely with as little bearing play as possible. To this end, the arrangement of an additional bearing 85 alongside the intermediate shaft bearing 84 is advisable.

The intermediate shaft bearing 84 may be realized via two oblique ball bearings in an O-configuration, for example. In this case, two separate roller bearings may be arranged or also a compact subassembly made up of multiple bearings. For the precise bearing of the intermediate shaft, this should be mounted where possible on a housing element or a component fixedly connected to a housing or the stator 31 of the electrical machine 30, such as the support wall 21, for example. In addition or as an alternative to this, the intermediate shaft 80 may also be supported or mounted on other components and also other structural parts. Hence, for example, the first gearbox input shaft 55 may be supported on the intermediate shaft 80 with an additional bearing 85.

Figure 10:
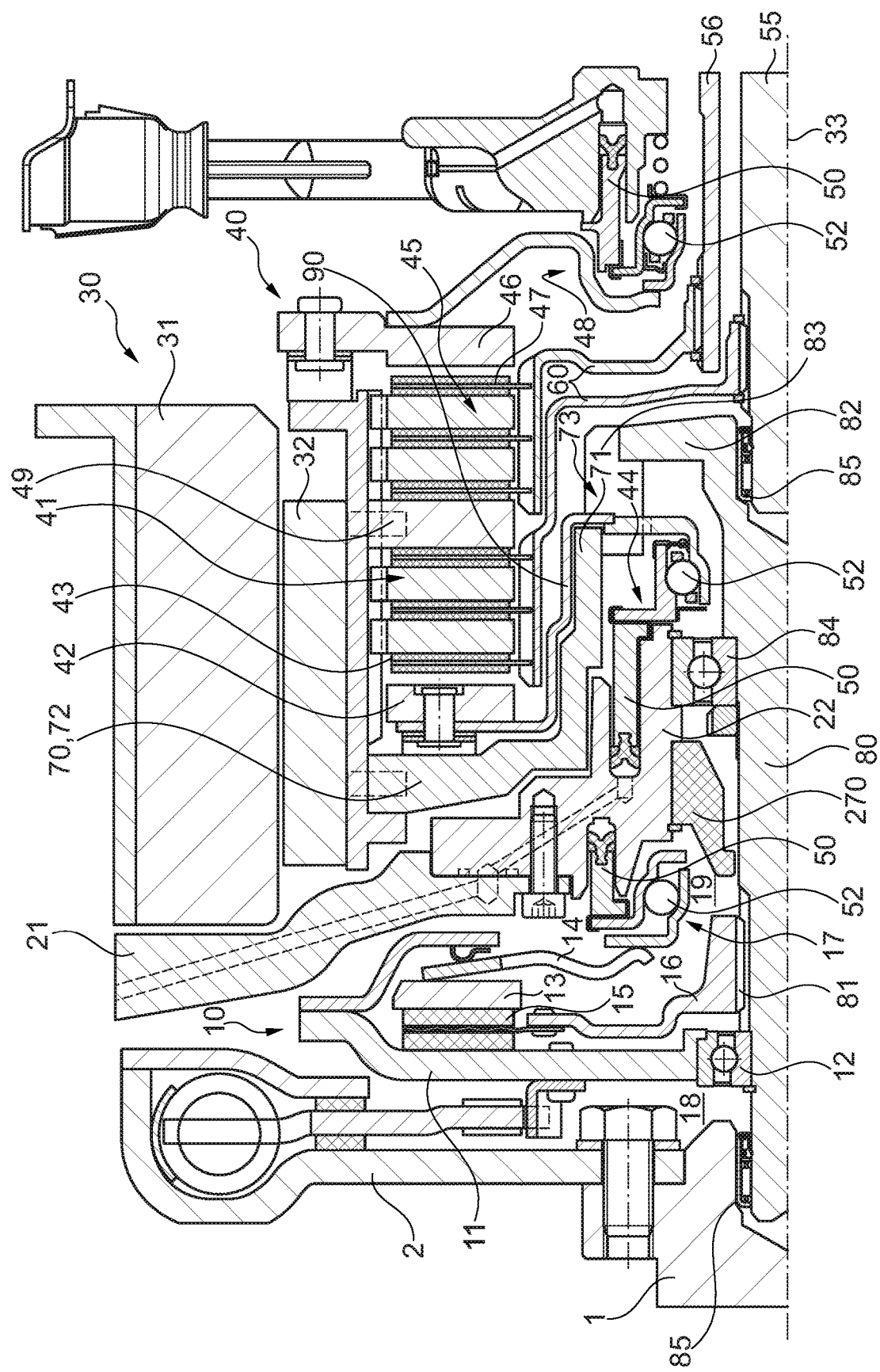
FIG. 10 shows a hybrid module with an intermediate shaft bearing on the support wall and the crankshaft.

A particular form of the intermediate shaft bearing 84 is depicted in FIG. 10. The intermediate shaft 80 in this case is connected to a single-row bearing, a grooved ball bearing, the support wall 21 or the housing of the disconnect clutch actuating system 17 fastened to the support wall 21. This bearing is configured as a fixed bearing, so that a further bearing point is configured as a loose bearing. This loose bearing is designed as a needle bearing in this case which forms an additional bearing 85. This additional bearing 85 may transmit radial forces between the intermediate shaft 80 and the crankshaft 1. This supporting of the intermediate shaft 80 on the crankshaft 1 has the advantage that when the disconnect clutch 10 is closed and the combustion unit is running at the same speed as the electrical machine 30, there is no differential speed between the crankshaft 1 and the intermediate shaft 80. Consequently, only bearing operation-related losses in the fixed bearing of the intermediate shaft 80 occur in this driving mode.

Consequently, a hybrid module not yet mounted on the crankshaft 1 also has one roller bearing. So that neither this bearing nor the electrical machine 30 is damaged due to excessive tilting of the intermediate shaft 80 and of the rotor carrier 70 connected thereto during transportation of the hybrid module, the tilting of the intermediate shaft 80 is limited to a permitted degree. This may be achieved by a limit stop spaced apart axially from the intermediate shaft bearing 84. In the embodiment depicted in FIG. 10, a stop sleeve 270 is provided to this end, which stop sleeve is arranged between the support wall 21 or the housing of the disconnect clutch actuating system 17 connected to the support wall 21 and the intermediate shaft 80.

The stop sleeve 270 is configured and arranged in such a manner that the intermediate shaft 80 can be supported by it in the transport state, as a result of which the maximum tilting of the intermediate shaft 80 is limited to a permitted extent. When the hybrid module is in the completely mounted state in which the intermediate shaft 80 is precisely aligned to the crankshaft 1 by the additional bearing 85, the stop sleeve 270 is no longer effective and does not create a friction point.

For the purpose of efficient heat removal from the hybrid module and also for the further reduction in drag losses in bearings and clutches, some clutches in the hybrid module can be operated wet and some dry. Since the frictional energy occurring in the disconnect clutch 10 is usually considerably smaller than that in the two partial clutches of the dual-clutch device 40, a sensible embodiment of the hybrid module involves the use of a dry-running disconnect clutch 10 and a wet-running dual-clutch device 40. Based on the embodiment of a hybrid module already introduced with a support wall 21 running very far radially inwards which is only penetrated by the intermediate shaft 80, there are good prerequisites for a sealing partition between a wet space 24 and a dry space 23 in the hybrid module (ref. FIGS. 11-13, 15). Consequently, the support wall 21 may also be referred to as the partition wall or the partition wall subassembly.

Figure 11:
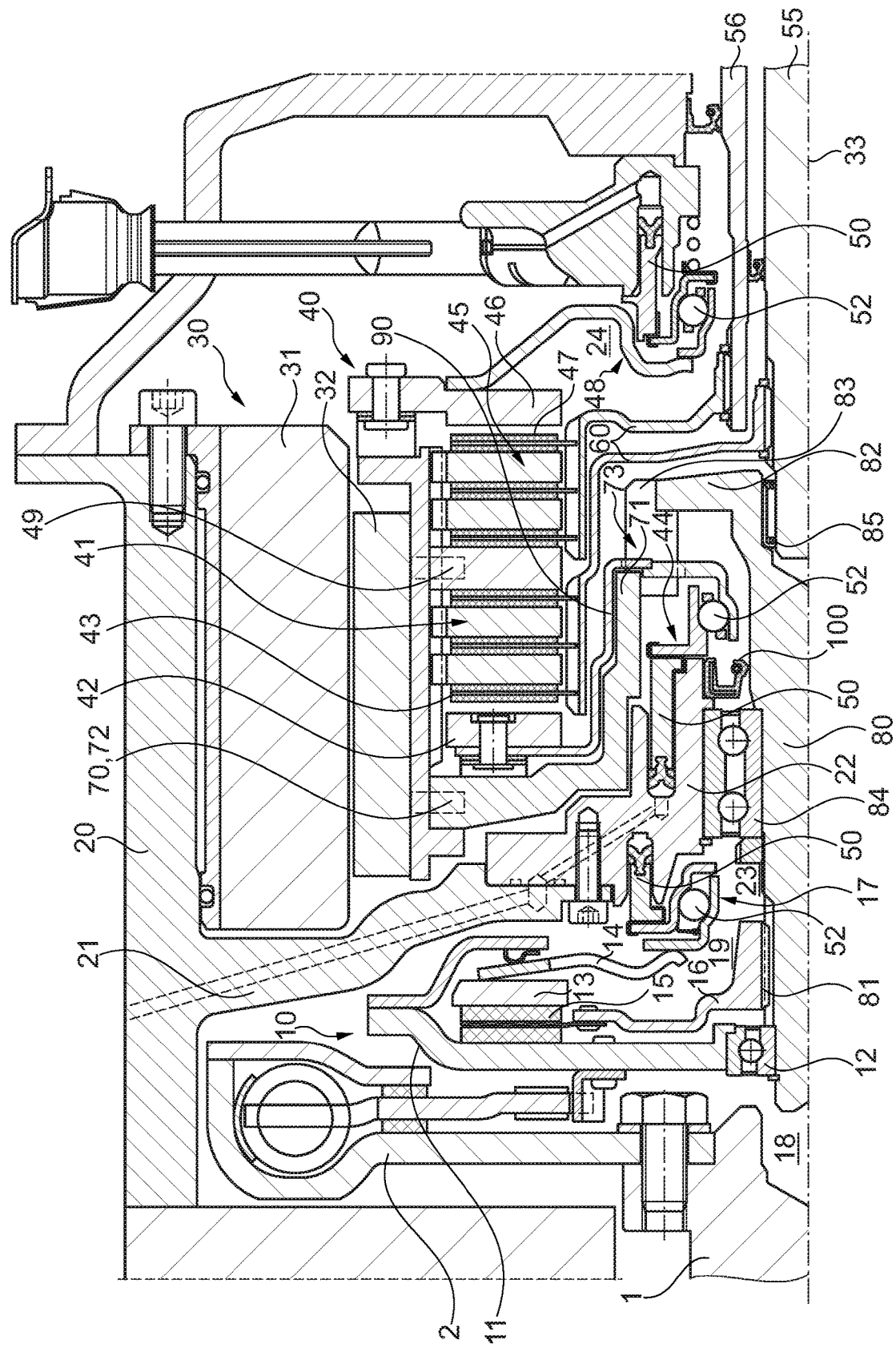
FIG. 11 shows a hybrid module with a seal for separating a dry space from a wet space in a first embodiment.
Figure 12:
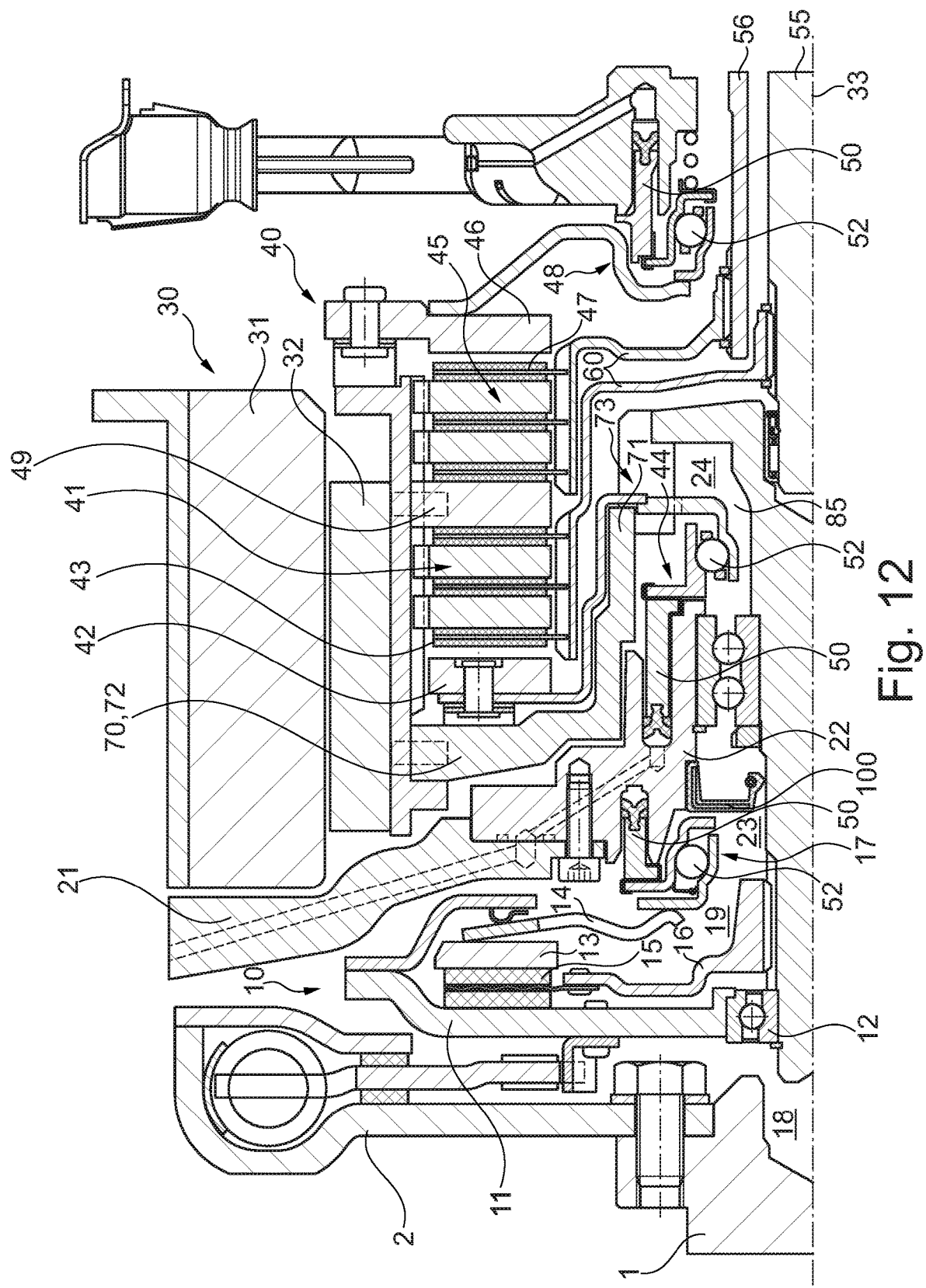
FIG. 12 shows a hybrid module with a seal for separating a dry space from a wet space in a second embodiment.
Figure 13:
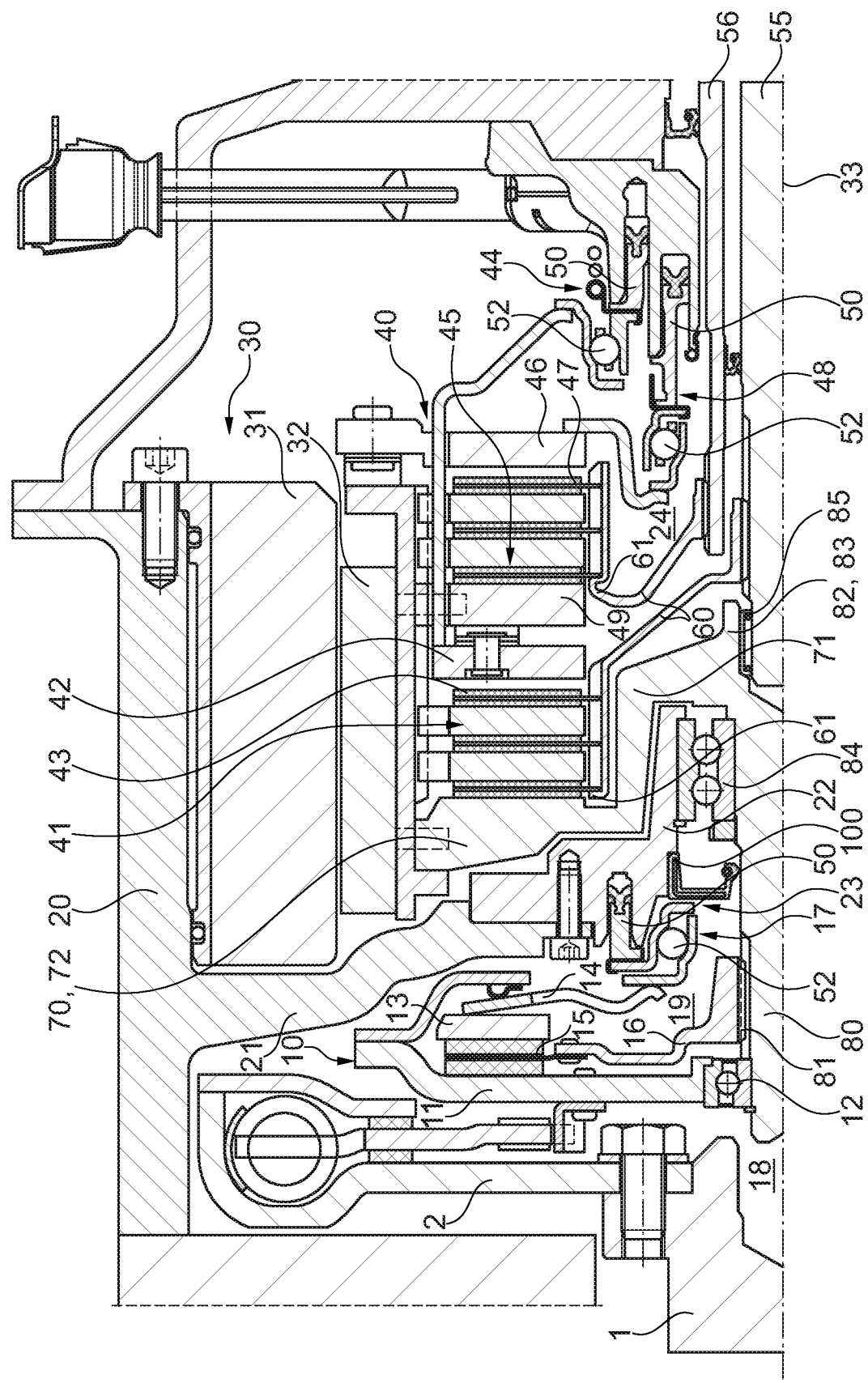
FIG. 13 shows a hybrid module with a seal for separating a dry space from a wet space in a third embodiment.

In the embodiments depicted in FIGS. 11, 12 and 13, a seal 100 in the form of a radial shaft sealing ring is provided between a housing of the disconnect clutch actuating system 17 mechanically connected to the support wall 21 and the intermediate shaft 80, with which the dry space 23 is separated from the wet space 24 in a liquid-tight manner.

Alternatively, the seal 100 may also be arranged directly between the support wall 21 and the intermediate shaft 80, as depicted in FIG. 15. Due to the leak-proof conveyance of the support wall 21 to the intermediate shaft 80, the seal 100 may be configured with a very small diameter, which reduces seal friction. The seal 100 may be arranged on each of the two axial sides of the intermediate shaft bearing 84. An example arrangement of the seal envisages that the intermediate shaft bearing 84 is located in the wet space 24 and can in this way be lubricated by the cooling oil in the wet space 24, which leads to a further reduction in drag losses.

The disclosure in this case is not limited to the arrangement of the dual-clutch device 40 in the wet space 24 and the disconnect clutch 10 in the dry space 23, but the dry space 23 and also the wet space 24 can also be assigned, conversely, to the two clutch devices.

The embodiments of the hybrid module configured with a seal 100 as depicted can be combined with all other kinds of embodiments designed to reduce drag losses. FIG. 13 shows a further embodiment in which the partial clutches 41, 45 of the dual-clutch device 40 are both actuated by actuating systems 44, 48 arranged on the gearbox side. Unlike in the case of the previously presented embodiments, the actuating systems 44, 48 in this case are arranged radially interlaced in relation to one another.

Figure 14:
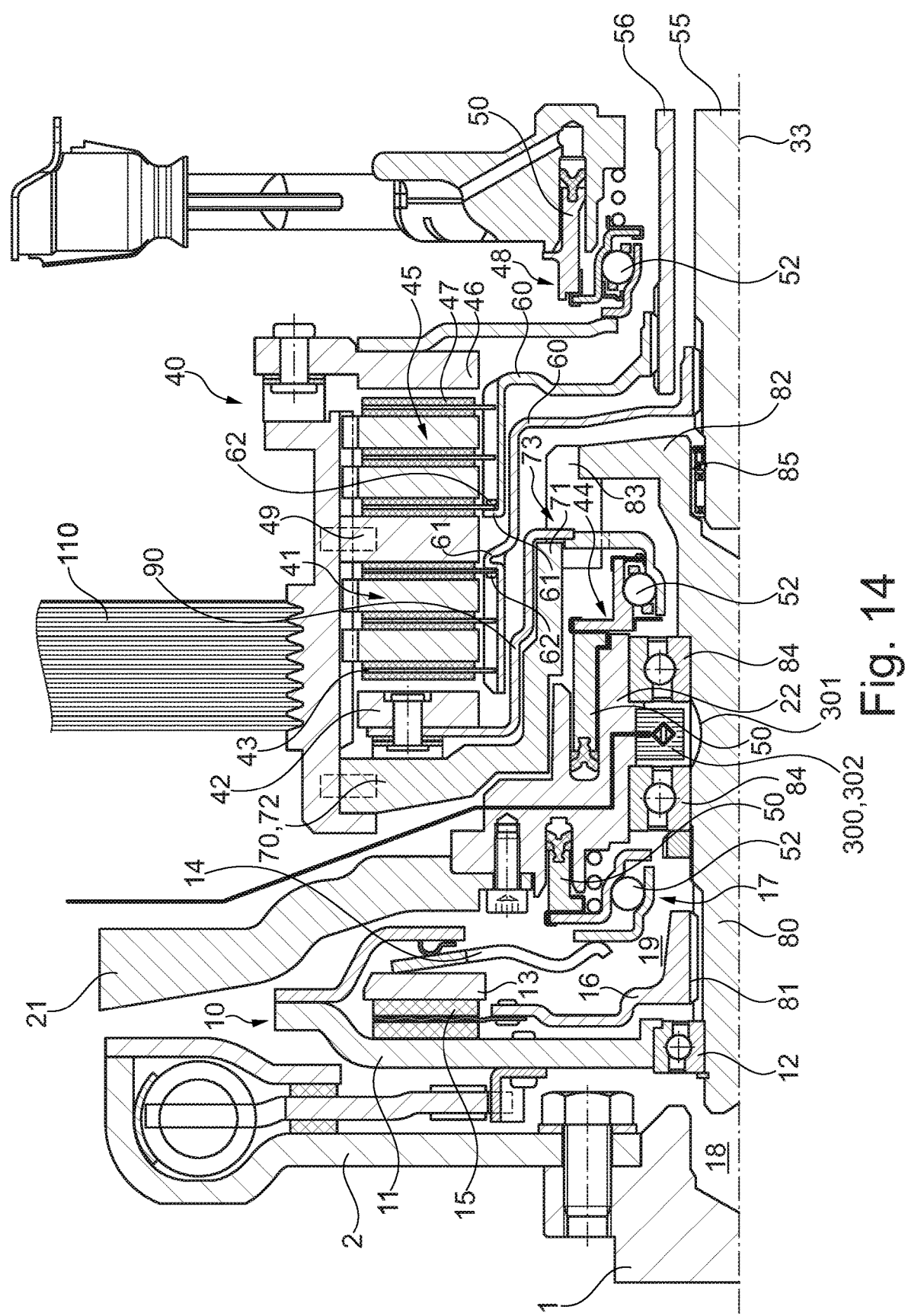
FIG. 14 shows a hybrid module with an angular position sensor in a first embodiment.

FIG. 14 shows a further embodiment of the hybrid module in which the rotor of the electrical machine is not directly coupled to the rotor carrier. In this case, a rotor (not shown) of an electric motor is connected by means of a mechanism 110, only a wrap-around means thereof being shown in this case, to the rotor carrier 70 and therefore to the dual-clutch device 40. The rotor carrier 70 in this case is therefore configured as a belt pulley. The general method of operation of the hybrid module remains the same; only the position of the electrical machine in relation to the dual-clutch device 40 has changed. Instead of an axis-parallel mechanism 110 indicated in this case, an angular mechanism may also be arranged, which can transmit a rotational movement of the rotor of the electrical machine in an angularly offset manner to the rotor carrier 70.

So that the electrical machine 30 can be precisely powered with energy, a control unit of the hybrid module and/or of the electric motor must know the angular position of the rotor 32. To this end, the hybrid module has an angular position sensor 300. This angular position sensor 300 is arranged in the immediate proximity of the bearing of the rotor carrier 70 which corresponds in most embodiments to the intermediate shaft bearing 84. The angular position sensor 300 may detect the relative angular position of the intermediate shaft 80 in relation to the support wall 21, or vice versa, when it is arranged on the intermediate shaft 80.

Figure 16:
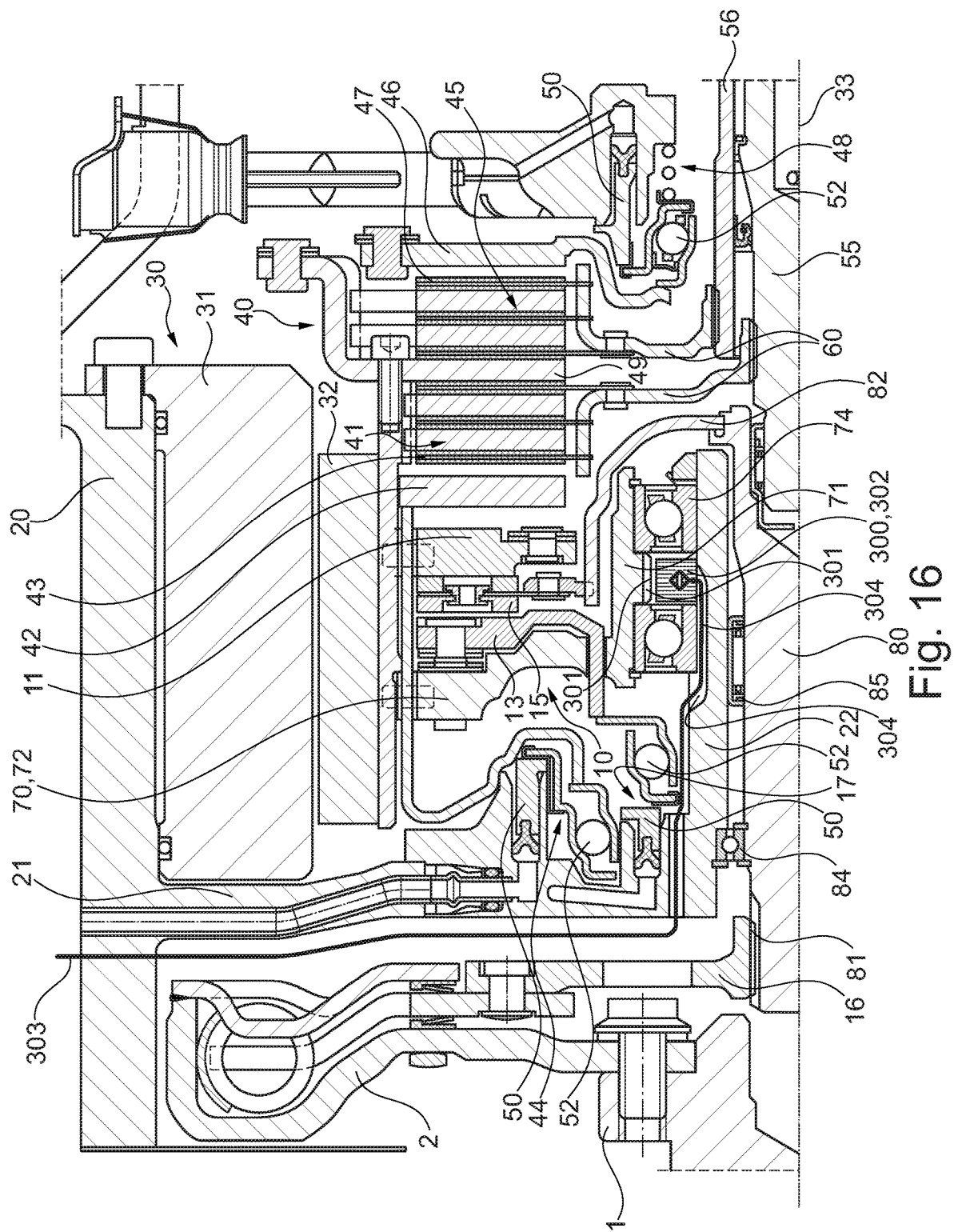

To this end, the angular position sensor 300 (ref. FIGS. 14-16) may have at least one sensor element 301 which is fixedly arranged at or on the intermediate shaft 80, for example, and also a detection element 302 which is arranged in a stationary manner on the support wall 21. The detection element 302 measures the angular movement of the sensor element 301.

The direct proximity to the bearing of the rotor means that positional tolerances of individual components of the hybrid module in an axial and/or radial direction and also vibrations between the components or subassemblies are not evident, or to a negligible extent, during detection of the angular position. This facilitates the design of the angular position sensor 300 and reduces the volume thereof and also the cost thereof.

The angular position sensor 300 may be arranged alongside individual roller bearings which form the intermediate shaft bearing 84, as is depicted in FIG. 15. As an alternative to this, the angular bearing sensor 300, as shown in FIG. 14, may be arranged between the bearings of the intermediate shaft bearing 84.

The angular position sensor may form a compact subassembly along with the bearings. The sensor element 301 may be fastened to an inner bearing ring or an outer bearing ring of a bearing and/or the detection element 302 may be arranged in a corresponding manner on the other bearing ring in each case. In this way, the angular positions of the bearing rings can be detected in relation to one another, which also corresponds to the angular position of the intermediate shaft 80 in relation to a housing and consequently also to the angular position of the rotor 32.

FIG. 15 shows an embodiment in which the intermediate shaft 80 is mounted on the support wall 21 to which a housing for an actuating system is attached on both sides. The angular position sensor 300 is likewise fastened to a support wall 21. A region of the angular position sensor 300 is partially connected to the housing of the disconnect clutch actuating system 17 and partially connected to the support wall 21. The sensitive sensor region is located radially inside on the angular position sensor, so that this is arranged in the immediate vicinity of the intermediate shaft bearing 84 and measures on a sensor element 301 spaced apart in the radial direction and connected to the intermediate shaft 80.

As an alternative to the radially or axially spaced sensor element 301, the detection element 302 can also measure on a sensor sleeve connected to the intermediate shaft 80 or directly on a structured or magnetized intermediate shaft 80, as depicted in FIG. 14, for example. The detection element 302 and/or the sensor element 301 may exhibit interruptions, recesses, projections, thickness fluctuations, differently magnetized regions and/or different materials distributed over the circumference.

The angular position sensor 300 may be located in a circumferential position behind the disconnect clutch actuating system 17, so that a connection line 303 between the radially inner sensor region and one or multiple radially outer connection plugs arranged on the disconnect clutch actuating system 17 can easily be guided. The angular position sensor 300 may be an integral part of a subassembly also including the disconnect clutch actuating system 17. In an alternative embodiment, the angular position sensor 300 is integrated in the housing of a clutch actuating system, e.g. of the disconnect clutch actuating system 17.

The embodiment in FIG. 15 shows in a manner already described a hybrid module with a dry space 23 and a wet space 24. The angular position sensor 300 may be arranged in the dry space 23. Due to its fixed connection to the intermediate shaft 80, it can, however, also detect the angular position thereof in the wet space 24 and, consequently, also the position of the rotor 32 in the wet space 24.

Accordingly, it is possible to avoid the connection line 303 for the angular position sensor 300 being guided through the wet space, so that no measures have to be taken to seal the connection line 303. In the embodiments according to FIGS. 1 to 15, the intermediate shaft bearing 84 also corresponds to the rotor carrier bearing.

The general function of the angular position sensor 300 is to detect the angular position of the rotor 32 or the rotor carrier 70 in relation to the stator 31 or housing 20. This function must be fulfilled irrespective of whether the rotor is mounted on the intermediate shaft 80 or not. Consequently, the angular position sensor 300 in embodiments of the hybrid module may also be arranged proximate to the rotor carrier bearing 74, as depicted in FIG. 16. In the embodiment depicted here, the measures described hitherto for reducing drag losses, the separation of wet and dry spaces, the embodiments of the disconnect clutch and the arrangement of the actuating systems need not necessarily be implemented.

In the embodiment shown in FIG. 16, the rotor 32 of the electrical machine 30 is arranged on the rotor carrier 70. This is supported on the support wall 21 or else on the portion 22 thereof extending in an axial direction by means of the rotor carrier bearing 74. The angular position sensor 300 in this case is located between the two roller bearings of the rotor carrier bearing 74. In this case, the detection element 302 is fastened to the rotor carrier 70 or integrated in the rotor carrier 70. The angular position sensor 300 is fastened to the support wall 21 and detects the angular position of the rotor carrier 70 positioned radially about it. For this purpose, the rotor carrier 70 is provided with a structure arranged on the radially inner side.

The connection line 303 for connecting the angular position sensor 300 to a control unit not depicted in this case runs within the portion 22 of the support wall 21 extending in an axial direction and through the support wall 21. For this purpose, in the portion 22 of the support wall 21 extending in an axial direction, there is a groove 304 for receiving the connection line 303, so that it can run on the radially inside of the rotor carrier bearing 74 without the strength of the rotor carrier bearing 74 being reduced.

The necessary length of the groove 304 depends on the assembly concept. If the connection line 303 is guided through the groove 304 after the rotor carrier bearing 74 has been arranged by pressing on, for example, the groove 304 need only be present in the immediate region of the rotor carrier bearing 74. In an alternative embodiment, the groove 304 may also lead up to the axial end of the portion 22 of the support wall 21 extending in an axial direction. This enables the connection line 303 to be introduced even before the assembly of the rotor carrier bearing 74 in the groove 304.

Consequently, a hybrid module is provided which in the case of a compact design can be operated in an energy efficient manner due to small drag losses in the bearings.

REFERENCE NUMERALS

1 Crankshaft
2 Dual-mass flywheel
10 Disconnect clutch
11 Counter-pressure plate
12 Support bearing
13 Contact-pressure plate
14 Spring element, pressure pot
15 Clutch disk
16 Transmission element
17 Disconnect clutch actuating system
18 Drive side
19 Output side
20 Housing
21 Support wall
22 Portion extending in an axial direction
23 Dry space
24 Wet space
30 Electrical machine
31 Stator
32 Rotor
33 Rotational axis
40 Dual-clutch device
41 First partial clutch
42 Contact-pressure plate of the first partial clutch
43 Clutch disk of the first partial clutch
44 First actuating system
45 Second partial clutch
46 Contact-pressure plate of the second partial clutch
47 Clutch disk of the second partial clutch
48 Second actuating system
49 Counter-pressure plate
50 Piston cylinder unit
51 Radial extent
52 Actuating bearing
53 Spring element, pressure pot
54 Radial spacing
55 First gearbox input shaft
56 Second gearbox input shaft
60 Carrier device
61 Radial projection
62 Mechanical connection
70 Rotor carrier
71 Axial portion of the rotor carrier
72 Radial portion of the rotor carrier
73 Recess
74 Rotor carrier bearing
80 Intermediate shaft
81 Spline
82 Radial portion of the intermediate shaft
83 Connection of the intermediate shaft and rotor carrier
84 Intermediate shaft bearing
85 Additional bearing
86 Spline
90 Connection element, tie rod
100 Seal
110 Mechanism
120 Axially fixed clutch disk
200 First contact-pressure plate
201 First contact-pressure element
210 Second contact-pressure plate
211 Second contact-pressure element
212 Third contact-pressure element
220 First clutch disk
230 Second clutch disk
240 Axial force
250 Supporting force
260 Opening device
262 Securing element
263 Adjusting disk
270 Stop sleeve
300 Angular position sensor
301 Sensor element
302 Detection element
303 Connection line
304 Groove

The invention claimed is:

1. A drive module for a motor vehicle comprising:
a housing;
an electric machine for generating a drive torque and comprising a rotor;
a rotor carrier connected substantially rotationally fixed to the rotor and mounted such that it can be rotated at least radially; and,
an angular position sensor for measuring an angular position of the rotor carrier;
a separating clutch for:
transmitting a torque from an internal combustion engine to the drive module; and
disconnecting the drive module from the internal combustion engine;
a clutch device for transmitting an output torque from the electric machine or the separating clutch to a drive train; and,
a clutch actuating system for actuating the separating clutch or the clutch device, wherein:
the angular position sensor is arranged such that the angular position of the rotor carrier or a first component substantially rotationally fixed to the rotor carrier can be detected by the angular position sensor in relation to a second component fixed to the housing;
the housing comprises a housing element and
the clutch actuating system comprises a piston arranged in the housing element.

2. The drive module of claim 1 wherein the drive module is a hybrid module for coupling the internal combustion engine.

3. The drive module of claim 1 wherein the housing comprises a supporting wall and the second component is the supporting wall.

4. The drive module of claim 1
wherein:
the angular position sensor comprises a sensor element and a detection element; and
the detection element is integrated into the housing element.

5. The drive module of claim 1, further comprising a supporting wall fixed to the housing, wherein the rotor carrier comprises a rotational bearing radially supported by the supporting wall.

6. The drive module of claim 1 further comprising
an intermediate shaft:
for transmitting the torque from the internal combustion engine to the rotor carrier;
substantially rotationally fixed to the rotor carrier; and,
mounted such that it can be rotated radially.

7. The drive module of claim 6, wherein:
the housing comprises a supporting wall; and,
the angular position sensor comprises:
a sensor element arranged on the intermediate shaft or the rotor carrier; and,
a detection element arranged on the supporting wall.

8. The drive module of claim 7, wherein the sensor element is a rotary sensor.

9. The drive module of claim 7, wherein the sensor element is an integral constituent part of the intermediate shaft or the rotor carrier.

10. The drive module of claim 7, further comprising a rotor carrier bearing system comprising a plurality of individual bearings, wherein:
the rotor carrier is rotationally mounted by the rotor carrier bearing system; and,
the sensor element and the detection element are each arranged between a respective pair of bearings of the plurality of individual bearings.

11. The drive module of claim 7, further comprising a rotor carrier bearing system, wherein:
the rotor carrier is rotationally mounted by the rotor carrier bearing system; and,
the sensor element and the detection element are arranged in or on the rotor carrier bearing system such that the rotor carrier bearing system and the angular position sensor together form one structural unit.

12. A drive arrangement for a motor vehicle comprising:
the internal combustion engine;
a transmission; and,
the drive module of claim 1 further comprising a first clutch and a second clutch, wherein the drive module is mechanically connected to the internal combustion engine by the first clutch and mechanically connected to the transmission by the second clutch.

13. A drive module for a motor vehicle comprising:
a housing comprising a supporting wall;
an electric machine for generating a drive torque and comprising a rotor;
a rotor carrier connected substantially rotationally fixed to the rotor and mounted such that it can be rotated at least radially;
a separating clutch for:
transmitting a torque from an internal combustion engine to the drive module; and,
disconnecting the drive module from the internal combustion engine; and,
an intermediate shaft:
for transmitting the torque from the internal combustion engine to the rotor carrier;
substantially rotationally fixed to the rotor carrier; and,
mounted such that it can be rotated radially; and
an angular position sensor for measuring an angular position of the rotor carrier, comprising:
a sensor element arranged on the intermediate shaft or the rotor carrier; and,
a detection element arranged on the supporting wall;
a rotor carrier bearing system comprising a plurality of individual bearings, wherein:
the angular position sensor is arranged such that the angular position of the rotor carrier or a first component substantially rotationally fixed to the rotor carrier can be detected by the angular position sensor in relation to a second component fixed to the housing;
the rotor carrier is rotationally mounted by the rotor carrier bearing system; and,
the sensor element and the detection element are each arranged between a respective pair of bearings of the plurality of individual bearings.

14. The drive module of claim 13 wherein the drive module is a hybrid module for coupling the internal combustion engine.

15. The drive module of claim 13 wherein the second component is the supporting wall.

16. The drive module of claim 13 further comprising:
a clutch device for transmitting an output torque from the electric machine or the separating clutch to a drive train; and,
a clutch actuating system for actuating the clutch device, wherein:
the housing comprises a housing element;
the clutch actuating system is arranged in the housing element; and,
the detection element is integrated into the housing element.

17. The drive module of claim 13, wherein the rotor carrier comprises a rotational bearing radially supported by the supporting wall.

18. The drive module of claim 13, wherein the sensor element is a rotary sensor.

19. The drive module of claim 13, wherein the sensor element is an integral constituent part of the intermediate shaft or the rotor carrier.

20. The drive module of claim 13 wherein:
the rotor carrier is rotationally mounted by the rotor carrier bearing system; and,
the sensor element and the detection element are arranged in or on the rotor carrier bearing system such that the rotor carrier bearing system and the angular position sensor together form one structural unit.

* * * * *